Feb. 14, 1967           J. A. DREYFUS           3,304,369
SOUND ACTUATED DEVICES
Original Filed Dec. 4, 1961           11 Sheets-Sheet 1
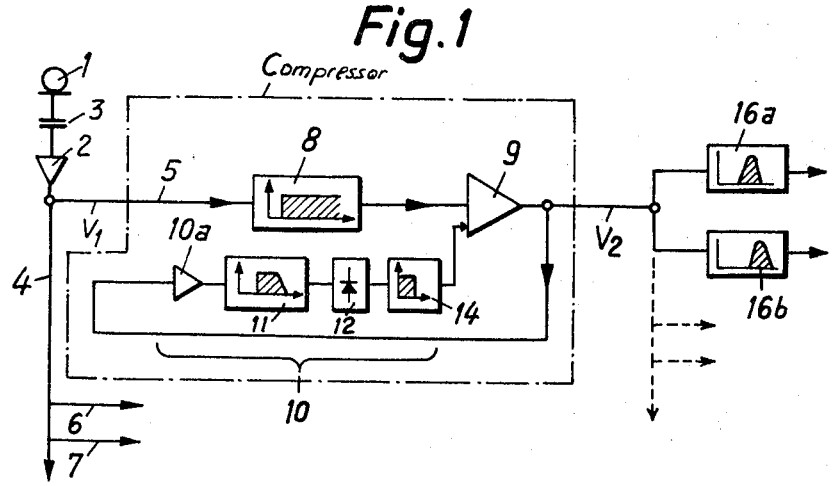
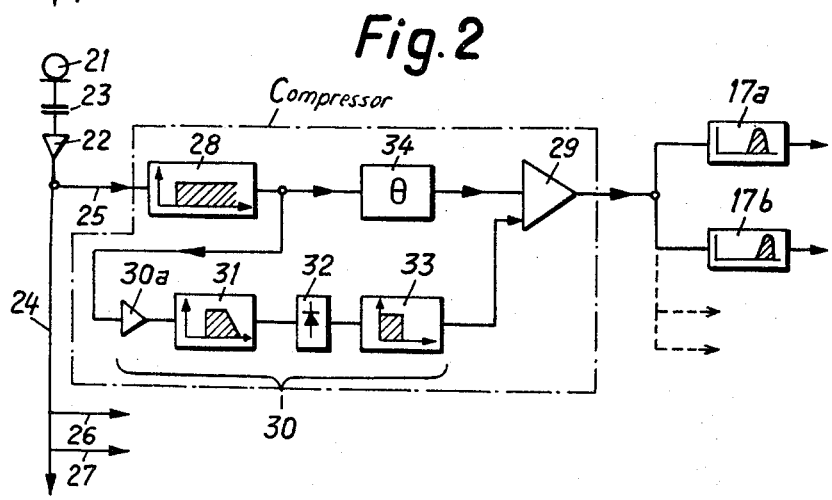
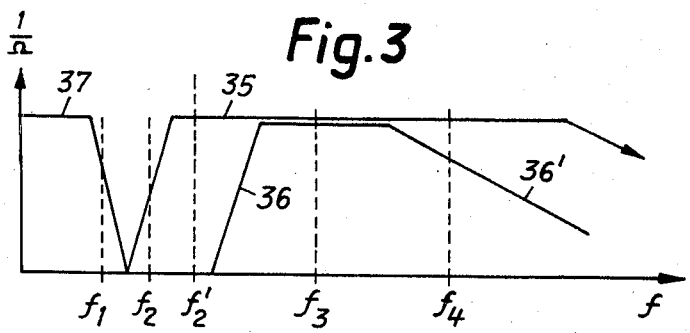

Feb. 14, 1967   J. A. DREYFUS   3,304,369
SOUND ACTUATED DEVICES
Original Filed Dec. 4, 1961   11 Sheets-Sheet 6

Fig. 18

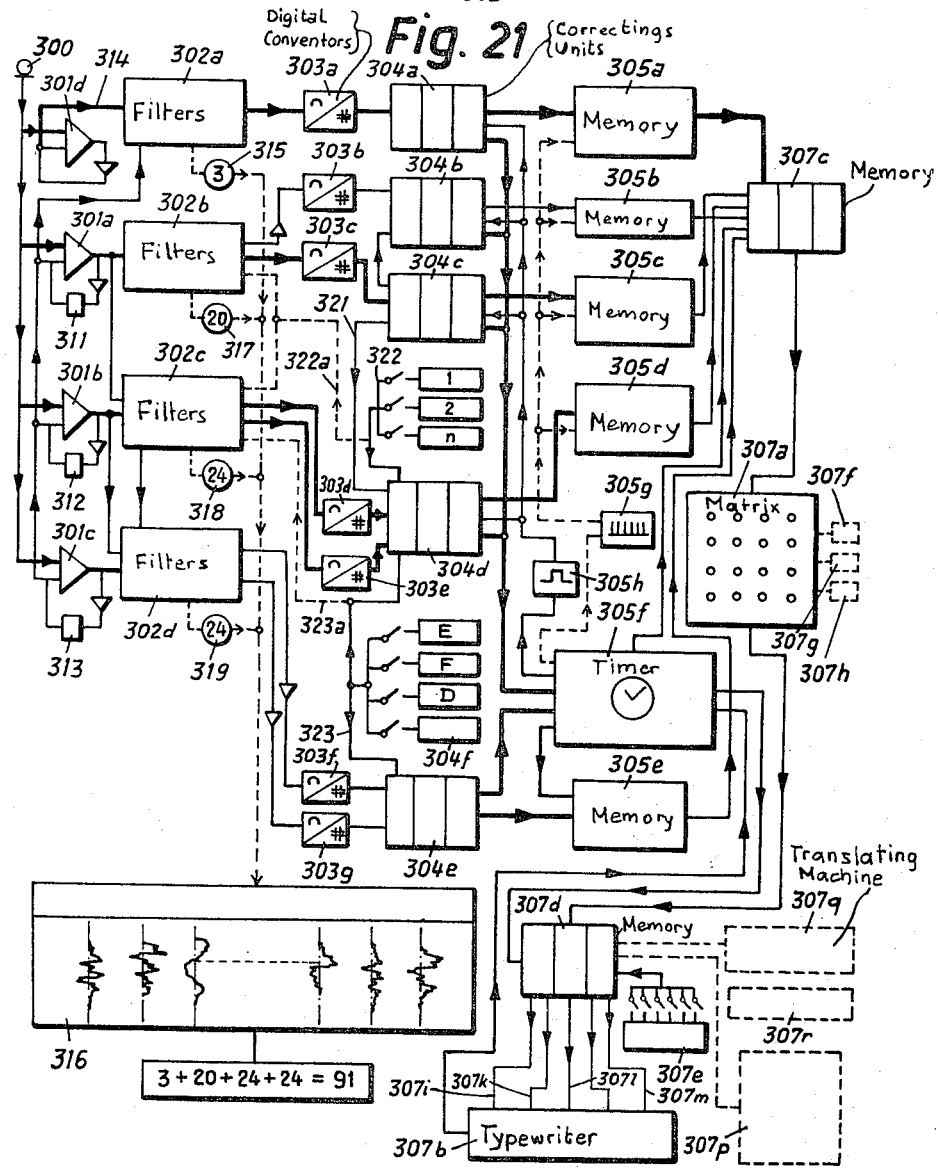

United States Patent Office 3,304,369
Patented Feb. 14, 1967

3,304,369
SOUND ACTUATED DEVICES
Jean Albert Dreyfus, 5 Ave. de la Grenade,
Geneva, Switzerland
Original application Dec. 4, 1961, Ser. No. 156,831, now Patent No. 3,238,301, dated Mar. 1, 1966. Divided and this application Oct. 19, 1965, Ser. No. 510,126
Claims priority, application Switzerland, Dec. 8, 1960, 13,835/60
16 Claims. (Cl. 179—1)

This application is a division of my co-pending application, Serial No. 156,831, filed December 4, 1961 now Patent No. 3,238,301.

The present invention generally relates to a novel method of and sound actuated devices for analyzing different types of sounds and for deriving signals which are adapted to actuate a suitable printer, such as a typewriter for example. The printer may for instance supply letters, figures or words, such as musical notes. The invention is additionally concerned with a novel method of a dynamic modifier, such as a compressor or expander, particularly adapted for processing the components of sound or encoded signals.

Aside from the foregoing, the teachings of the present invention can be employed for a large variety of applications. Thus, by way of example, and not limitation, the sound actuated device of the present invention, in addition to actuating a printer, can be adapted for performing other functions such as opening a door, printing cards, translating from one language to another. In fact, it is conceivable to employ the present invention for translation purposes where the spoken language is translated and the translation is printed or orally reproduced. Moreover, the dynamic modifier of the invention can be used as an expander and employed in a vocoder or for long distance telephony using a narrow band, and thus considerably reducing the costs of a conversation. Also, a plurality of encoded sounds may be combined in a secondary memory for printing words or sentences.

Devices are known to the art which are actuated by sound, such as sonographs and phonetographs which denote sound actuated recorders such as typewriters adapted to transform, for example, spoken language into written language or into any other system of logical significant information. The sound actuated devices are directly or indirectly based on spectral analysis of the wave form of the sound, as for example: (a) the amplitude spectrum as a function of the frequency (formant filters), (b) analysis of the variation of the spectrum as a function of time (sub-formant filters) i.e. first differential quotient of the amplitude with respect to time. In known devices there are employed amplitude compressors which logarithmically reduce the level variation of the electrical signals corresponding to the sound. These variations may be produced, for example, by the stronger or weaker voice of the speaker or by distance variations between the mouth of a user and the microphone.

In known compressors, even when the compression factor is very high, they cannot avoid that there will be present important level differences between different sounds which are to be analyzed. For example, the formant levels of the phonetic sounds "M" or "R" are much weaker than those of the sounds "A" or "O." The result is parasitic level differences which may be much greater than the level differences which are useful to the spectral analysis. It is, as if, the signals were disturbed by enormous noise. In order to better understand the problems encountered in the field of information theory for distinguishing 32 alphabetical signs of symbols reference is briefly made to a telegraph which needs only five frequency filters D each having 2 distinguishable amplitudes, that is 5 bits since $2^5=32$. At the speed of 15 symbols per second the information capacity $C_t$ of such a telegraph is $5 \times 15 = 75$ bits/sec. Quite to the contrary, the average sensitivity of the ear is comparable to a telegraph possessing $D=3000$ filters distributed between 16 c.p.s. and 16,000 c.p.s., whereby each of these filters is able to distinguish $N=100$ levels (decibels). Thus, the ear can distinguish $100^{3000} = 10^{6000}$ different sounds. This number is equivalent to $2^{20,000}$ i.e. 20,000 bits. On the other side, it is known that the ear can distinguish, in the average, up to $B=15$ sounds per second. Consequently, the information capacity of the ear $C_o$ is $$20,000 \times 15 = 300,000$$

bits/sec. It is to be seen that an enormous disproportion exists between the capacity of the ear (300,000 bits/sec.) and that of the telegraph (75 bits/sec.) for transmitting the same quantity of alphabetical or phonetical information. The human brain which possesses a memory of $10^{20}$ bits has no major difficulty in retaining all levels, either useful or not, and to abstract the parasitic or non-useful levels. But artificial memory including $10^{20}$ bits would have a prohibitive size. Therefore, it is necessary to find another solution for eliminating in advance the non-useful level variations.

Accordingly, it is a nimportant object of the present invention to provide an improved method and means for normalizing the number of possible levels of various phonetic sounds to a considerably reduced number, and thereafter classifying such sounds to actuate a printer or otherwise.

Another important object of the present invention is to provide an improved method and compressor apparatus which modifies and equalizes the relative levels of the different formants, but which prevents any non-linear distortion and production of parasitic harmonics.

Another important object of the present invention is to provide a novelly constructed dynamic modifier readily adapted for expanding or compressing the wave train of a signal derived from a sound, and particularly suited for use in conjunction with sound actuated devices of the type described.

A further important object of the present invention is to provide method and means for reliably recognizing the phonetic elements in the course of spoken language which may be represented by alphabetic expressions.

Another object of the present invention is to provide an improved method and apparatus for analyzing sounds in order to be able to reliably distinguish between various phonetic elements.

Still a further important object of the present invention is to transform spoken language into phonetically written language possessing a great degree of intelligibility.

Still a further important object of the present invention is to provide sound analyzing apparatus which reliably reproduces the main groups of the physiological characteristics of the sound, such as dynamics (intonation), melody, harmony, noise and rhythm.

Another important object of the present invention is to provide novel means for analyzing sounds, especially speech analysis, and employing such analysis for carrying out any electrical or mechanical logical action.

A further important object of the present invention is to provide oral input of computers for carrying out a desired logical action.

Still a further object of the present invention is to provide improved means for processing the formants and sub-formants of sounds to obtain logical significant information.

In known amplitude compressors, the amplitude spectrum of the controlled signal includes the entire frequency band of the sound which is to be analyzed, for example, between $f_2=50$ c.p.s. up to $f_3=8000$ c.p.s., and the spectrum of the controlling signal (feedback or forward) is practically identical to the spectrum of the controlled signal. The controlling signal is rectified and filtered by a low-pass filter whose uppermost frequency $f_1$ is smaller than the lowest frequency $f_2$ of the controlled signal, as for example, if $f_1=30$ c.p.s.

According to one aspect of the present invention the number of significant levels is considerably reduced by at least one selective compressor which may conveniently be termed a "leveler." In the present invention the total spectrum of the signal corresponding to the sound to be analyzed is controlled by at least one compressor whose controlling signal is modified by a filter, preferably at least one band-pass filter. For example, this band-pass filter will suppress the frequencies below 380 c.p.s. As a result, the fundamental frequency of the vocal cords of the speaker, which may vary between 80 c.p.s. to 380 c.p.s. will not contribute to the compression of the entire signal, which compression will be controlled only by frequencies greater than 380 c.p.s. Thus, the energy of the phonetic sound "M" is mainly around the fundamental frequency, while the energy of the phonetic sound "A" is mainly around 1000 c.p.s. Consequently, the weak formants of the "M" will be increased and become similar to the strong formants of the "A." It is even possible to provide as many "levelers" or selective compressors as there exist different sound characteristics to be identified.

Thus, for example, in order to better distinguish the sound "R" from the sound "O" whose spectrums are very similar, it is possible to provide a special leveler whose controlling signal is modified by a band-pass filter having its lower limits $f_2=600$ c.p.s. In this case, the formants of the sound "R" approaches that of the sound "O" and the characteristic levels of the respective spectrums of the two sounds are better evidenced. However, as a practical matter it is desirable to have a minimum quantity of compressors. In the first instance, what has been previously described is particularly suitable for the identification of the "quasi-fix formants" which correspond to the characteristic quasi-stationary parts of the sound, and whose relative levels are fundamentally improved. But the leveler of the present invention also modifies the identification of the sub-formants corresponding to the transient parts of the sound (significant noise and rhythm for synchronization).

It is known that the build-up time of any compressor $T_c=1/2f_1$ is limited by the frequency $f_1$ of the low-pass filter which itself must be lower than the lowest frequency $f_2$ of the controlled signal. If the frequency $f_1=30$ c.p.s. then $T_c=1/60=16$ milliseconds.

The leveler according to the teachings of the present invention may also be used for identifying certain transient sounds which are difficult to separate such at "P" from "K" and from "T." It is possible to choose a frequency $f_1<f_2$ in order that the build-up time of the compressor $T_c$ is smaller or larger than the build-up time of the sound which is to be identified, and that it creates or prevents an initial overshot of the controlled signal. Moreover, the leveler of the present invention facilitates the detection of the "sub-formants."

In a preferred manifestation of the present invention, an electrical signal representing sound is dynamically modified by a portion of the signal from which certain frequency components have been removed, and in many instances where the fundamental frequency has been removed. This modification for example tends to equalize high-frequency components of the signal. In order to encode the modified signal it is separated into individual frequency bands i.e. into formant components which contain the so-called quasi-stationary formants and the mobile formants. However, it is practically impossible to intelligibly distinguish all phonetic sounds simply from their formants. On the other hand, individual frequency bands may be tested for rate of change to provide further encoding of the signal by so-called sub-formants which together with the aforementioned formants enable recognition of most phonetic sounds without great expense. Then, to provide more perfect identification of certain individual phonetic sounds without greatly adding to equipment costs, frequencies beneath the fundamental frequency may be tested to provide further encoding by so-called follower formants. Further improvement in intelligibility is provided by encoding formant and sub-formant components for each phonetic sound in the electrical signal at different time constants.

By such encoding, speech represented by the electrical signal may be graphically portrayed, as by the actuation of an electric typewriter equipped to type phonetic characters, with a high degree of accuracy. Nevertheless, the necessary apparatus is inexpensive compared to phonetographs and sonographs which have heretofore been proposed in the art. In fact, the inventor contemplates that in large-scale production, apparatus embodying the present invention will be economically feasible for use in ordinary office dictation.

Certain elements of apparatus embodying principles of the present invention are believed to be novel and patentable per se such as the compressor or leveler which dynamically modifies the original signal. The novel compressor comprises a first channel for transmitting an electrical signal having a given frequency range, a second channel having its input terminals connected with said first channel and including means for passing only part of said given frequency range, and means for controlling the amplitude of the signal in the first channel by the signal passed by the second channel.

Further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

FIG. 1 is a circuit diagram schematically illustrating a preferred embodiment of a feedback controlled compressor designed according to the teachings of the present invention and adapted to be employed with sound actuated devices;

FIG. 2 is a circuit diagram of a forward controlled compressor designed according to the teachings of the present invention and adapted to be employed with sound actuated devices;

FIG. 3 is a graph showing passing ranges of the filters employed with the compressors of FIGURES 1 and 2;

FIG. 18 is a chart schematically illustrating the spectrogram of various sounds;

FIG. 20 is a flow diagram schematically illustrating the various components of a sound actuated device including the main components of the logic system; and FIG. 21 is a block diagram of a logic system which may be employed in conjunction with the sound actuated device of FIG. 10.

Figure 4:
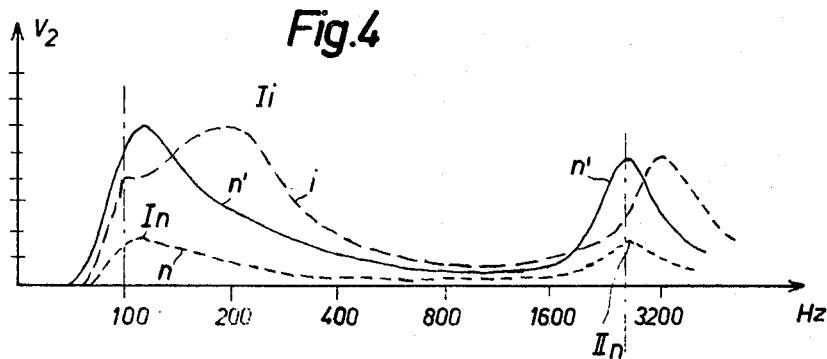
FIG. 4 is a spectrogram of human speech illustrating the changes in the spectrum of the sounds after passing through a compressor designed according to the teachings of the present invention.

Generally speaking and by way of example, the device comprises a microphone connected to a plurality of networks, with each network sorting out the characteristic information of the incoming wave train. As already mentioned hereinabove, the incoming signal present in each network must undergo an amplitude compression in order to also reduce the average 100 possible levels to a smaller number, such as two or three. For example, each amplitude compressor consists of a main channel and an auxiliary channel, whereby the signal is amplified in the main channel by means of an amplifier. In the auxiliary channel which is connected to the main channel there appears a signal which regulates the gain, that is to say, the degree of regulation or compression R of the amplifier in the main channel. The relationship between the input signal $V_1$, the output signal $V_2$, and the degree of regulation R is determined by the equation:

$$\log V_2 = R.\log V_1 + C$$

The degree of regulation R varies between 0 and 1 so that when $R=1$ no compression exists. The compression is more effective the closer R approaches zero. According to one feature of the present invention, a compressor is provided which possesses at least two channels whereby each of these channels includes filters with different passing ranges so that there appear at least two degrees of regulation R having different frequency functions.

Referring now to the drawings, there is illustrated in FIGURE 1 a microphone 1. Naturally, in place of the microphone 1 there can be employed a tape recorder or any other suitable apparatus which transmits electrical signals derived from the sound to be analyzed. The microphone 1 is connected with a preamplifier 2 which amplifies the input signal. Preferably, the preamplifier 2 operates as a function of the frequency e.g. by means of a series connected capacitor 3. The capacitor 3 works in such a manner that the frequencies under about 1500 c.p.s are weakened in order to make the preamplifier characteristic similar to the physiological hearing characteristic. As a result, it is achieved, for example, that during analysis of the human voice the relatively large amplitude of the fundamental frequency as well as the lower formants are weakened in comparison to the higher frequencies. The pre-amplifier 2 is connected with a distributor conduit 4 from which branch-off several connections 5, 6 and 7 leading to a separate network provided for the processing of the input wave train. In FIGURE 1 there is indicated the compressor $C_1$ which is in circuit with the branch connection 5.

The signal coming from the distributor line 4 flows through the connection 5 to a high-pass filter 8, which eliminates the undesired lower frequencies according to the particular prescribed function of this channel. The signal leaving the high-pass filter 8 is fed to a controlled amplifier 9. The output signal of the controlled amplifier 9 is fed to a further amplifier 10a appearing in the auxiliary channel generally indicated by reference numeral 10. The auxiliary channel 10 produces the signal which controls the gain of the controlled amplifier 9. The output of the amplifier 10a is connected to a filter 11, the function of which will be more fully described hereinafter.

Preferably this filter 11 is a band-pass filter having a passing range which is smaller than the passing range of the high-pass filter 8. However, the filter 11 can also be a high-pass filter with its lower passing range lying above that of the high-pass filter 8. The output of the filter 11 is connected to a rectifier 12 which, in turn, is in circuit with a low-pass filter 14. The output signal of the low-pass filter 14 controls the gain of the amplifier 9, and in such a manner that the greater the amplitude of the input signal appearing in conduit 5 the smaller the gain. The regulation R is carried out such that there exists between the input signal $V_1$ and the output signal $V_2$ the previously mentioned relationship of log $$V_2 = R.\log V_1 + C$$

However, the regulation R assumes a different value for the frequency components lying within and without the passing range of the filter 11. In order to distinguish between the different frequency components appearing at the output terminals of the amplifier 9 there is provided a plurality of parallelly arranged formant or band-pass filters 16a, 16b, etc., for sake of clarity in illustration only two such band-pass filters have been shown. The band-pass filters 16a, 16b and so forth possess passing bands which differ from one another.

As variant of the embodiment disclosed in FIGURE 1, it is also possible to have the regulation carried out in a manner as indicated in FIGURE 2. In the variant compressor $C_2$ of FIGURE 2 there is also provided a microphone 21 which is connected by means of a capacitor 23 with a preamplifier 22. The output of the preamplifier 22 is connected to a distributor conduit 24 from which branch-off the further conduits 25, 26, 27 and provide an electrical connection with the various channels.

The function of the elements 21–27 is the same as the function of the elements 1–7 described with reference to the embodiment of FIGURE 1. In a like manner, the auxiliary channel 30 is formed of an amplifier 30a, a band or high-pass filter 31, a rectifier 32 and a low-pass filter 33 arranged in a manner similar to the corresponding components of the auxiliary channel 10 of the embodiment of FIGURE 1. Connected in circuit with the conduit 25 is a high-pass filter 28, the output of which on the one hand, is connected with the amplifier 30a and, on the other hand, with a time delay component or delay line 34. The output of the delay line 34 is connected with a controlled amplifier 29. In a similar manner as with the description of FIGURE 1, there is connected to the output terminals of the amplifier 29 a plurality of formant or band-pass filters 17a, 17b, etc. for purpose of distinguishing between the different frequency components. Again, these band-pass filters possess passing bands which differ from one another. In the embodiment of FIGURE 1 there is provided a so-called feedback control, whereas in the embodiment of FIGURE 2 there is a forward control.

In FIGURE 3 there is graphically depicted the function of the various filters 8, 11 and 14 of FIGURE 1 as well as that of the filters 28, 31 and 33 of FIGURE 2. The graph appearing in FIGURE 3 is equally representative of both of these embodiments. The pass-range of the high-pass filter 8 and 28 is represented by the curve 35 with the lower limit thereof at approximately $f_2$; that of the band-pass filters 11 and 31 by the curve 36 which band thereof contains the frequency $f_3$; and finally that of the low-pass filters 14 and 33 by the curve 37 which contains frequencies up to approximately $f_1$. It is to be seen that the passing range of the curves 35 and 37 do not overlap. The low-pass filters 14 and 33 preferably transmits only changes in the amplitude of the rectified signal, not however, components of the signal itself. For example, if in a specific channel frequencies in the order of up to 400 c.p.s. are to be processed, then the passing range of the high-pass filters 8 to 28 begins, for example, at $f_2=400$ c.p.s., whereas the passing range of the low-pass filters 14 and 33 terminates at approximately a frequency $f_1=380$ c.p.s., so that changes of amplitude up to a time constantt $T_c$ of the regulation can be processed. The time constant $T_c$ can be calculated from the equation: $T_c=1/2f_1$ so that when $f_1=380$ c.p.s., $T_c=1/760=1.3$ milliseconds.

In order to more clearly explain the purpose of the band or high-pass filters 11 and 31, it is to be assumed for the moment that it is, for example, the assignment of a network, to distinguish between the phonetic sounds "n" and "i."

Unexpectedly, it has been shown by a spectral analysis of these phonetic sounds that their spectrums are comparatively similar to one another. For the sake of clarity in understanding, reference is made to FIGURE 4 which shows the amplitude distribution of the phonetic sounds "i" and "n" from a particular speaker as a function of the frequency. It is to be seen that both sounds "i" and "n" each exhibit a first formant $I_i$ and $I_n$ at approximately a frequency of 200 c.p.s. and at the ground frequency of 100 c.p.s., respectively, and a second formant $II_i$ and $II_n$ at approximately 3000 c.p.s. and 2600 c.p.s., respectively.

A differentation between these two phonetic sounds is possible by means of these second formants. With a conventional compressor, however, the second formant $II_n$ of the phonetic sound "n" becomes so weak that as a practical matter the level of this second formant is no longer normally measurable with standard levels. The relatively large weakening of this second formant can be attributed to the fact that the first formant $I_n$ also regulates the compression of the second formant $II_n$. According to the teachings of the present invention there is now provided in the auxiliary or controlling channels 10 and 30 a filter, e.g. a band-pass filter 11 and 3, respectively, which for example eliminate the components under 400 c.p.s. so that the amplitude of the second formant $II_n$ exclusively determines the degree of compression. As a practical matter, the result is that the amplitude of the second formant $II_n$ of the sound "n" is made similar in amplitude to the second formant $II_i$ of the sound "i." For distinguishing the phonetic sound "n" from the sound "i" there is now available two approximately equally high levels, the differences in frequency of the corresponding second formants can be easily determined. By means of the compressor of the present invention there results a strong increase of the second formant of the sound "n," as can readily be seen by reference to the curve n' of FIG. 4.

The conditions for processing of the sounds will again be more clearly set forth hereinafter with reference to FIGURES 5 and 6, which graphically depict the amplitude of the wave train, for example, of the phonetic sounding word "novelti."

Figure 5:
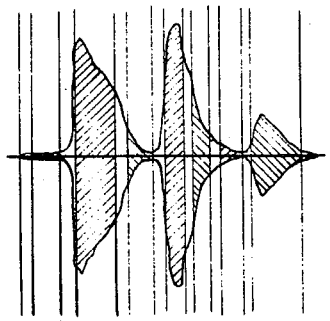
FIG. 5 is a graph illustrating the amplitude shape of a particular spoken word before compression.
Figure 6:
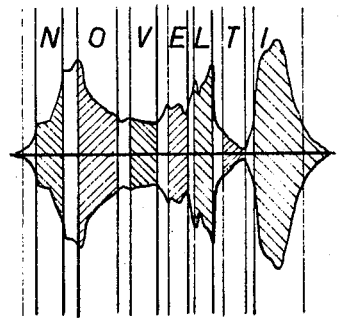
FIG. 6 is a graph illustrating the amplitude shape of the sound shown in FIG. 5 and after having undergone compression in accordance with the teachings of the present invention.

FIGURE 5 shows the wave form as represented by an oscillograph prior to undergoing the invention amplitude compression, and FIGURE 6 the appearance of such wave form after having undergone such a compression. It can be seen from FIGURE 5, that the overall amplitude of the consonants "n," "v" and "l" is very small in comparison with that of the vowels "o," "e" and "i" which are relatively high, so that an evaluation or analysis after undergoing a normal amplitude compression, as a practical matter, results in considerable difficulties. Upon having undergone an amplitude compression in accordance with the teachings of the present invention, the formants of the consonants "n," "v" and "l" are increased in comparison with those of the previously mentioned vowels, so that there results a curve shape possessing comparable amplitudes of the formants. Under these working conditions the compressor may or may not produce equal overall amplitudes. With the compressor of the present invention such is attributable to the fact that the lower components of the consonants "n," "v" and "l" lie in the elimination range of the band or high-pass filters 11 (FIG. 1) and 31 (FIG. 2) and thus do not contribute to the compression.

In the wave form of FIGURES 5 and 6 the wave or surge front of the oscillation of the "i" includes the characteristics of the sound "t." With respect to this, such shall be explained with greater particularity hereinafter. It is to be mentioned at this time that also with the following considerations there is employed a mode of printing or writing which corresponds to the phonetic reproduction of the spoken language.

Figure 7:
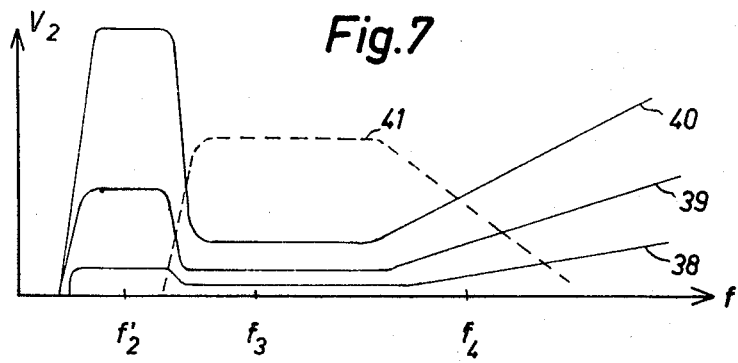
FIG. 7 is a graph illustrating the characteristics of the compressor and depicting the output voltages as a function of frequency for three different input voltage conditions.
Figure 8:
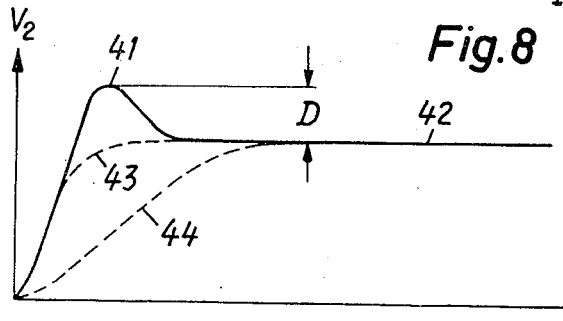
FIG. 8 is a graph showing the characteristic of the output voltages as a function of time for a compressor designed according to the teachings of the present invention.

Finally, the order to further explain the amplitude compressors $C_1$ and $C_2$ of FIGURES 1 and 2, reference is made to FIGS. 7 and 8 which show the characteristic of the amplitude compressor in dependence of the frequency and time, respectively.

The curves 38, 39 and 40 represent the output voltage $V_2$ of the compressor as a function of the frequency. The ratio of the voltages at the input side of the compressor is for example 1:20:400. At the frequency $f_2'$ the three voltages are in the ratio, for example, 1:10:100. At this frequency $f_2'$ which is below the passing range of the high or band-pass filters 11 or 31 (FIGS. 1 and 2), as a practical matter a very small compression occurs. Consequently, there is only transmitted a relatively small controlling signal from the respective auxiliary channels 10 and 30 to the respective controlled amplifier 9 or 29, so that the gain is reduced a small amount. For purposes of clarification, the passing range of the band-pass filters 11 and 31 has been shown in FIGURE 7 by the broken line curve 41. At the frequency $f_3$ (FIGS. 3 and 7) which lies within the passing range of the band-pass filters 11 and 31 there is transmitted a relatively high signal through these filters 11 and 31 to the controlled amplifier 9 and 29, respectively, so that there is achieved a compression in a considerably higher degree. At the frequency $f_3$ there exists the relationship between the three voltages $V_2$, for example, of 1:2:4. The relationship of the compression rate at the frequency $f_2'$ is, for example, $400:100=4$, whereas at the frequency $f_3$ it is $400:4=100$.

The degree of compression is decreased above the passing range of the band-pass filters 11 and 31. If the filters 11, 31 are designed as high-pass filters then the degree of compression remains substantially constant above the beginning of the passing range of these filters.

In order to further explain the relationship of the degree of compression resulting at higher frequencies when the filters 11 and 31 are constructed as band-pass filters reference is made once again to FIG. 3 which graphically illustrates the passing range of the various filters. It is to be recognized that with increasing frequencies the impedance of the band-pass filters 11 and 31 preferably slowly increases, as may best be seen by the slowly descending slope 36' of the curve 36. Consequently, with increasing frequencies, the signal which is transmitted to the auxiliary channel is reduced so that the compression is also reduced. This may be seen by the increasing distances between the curves 38, 39 and 40 at increasing frequencies, as clearly shown in FIG. 7.

With a number of phonetic sounds the speed of change of the amplitude is characteristic. Accordingly, it is necessary in an apparatus which, for example, is controlled by spoken sounds to provide means for obtaining a signal which is a measure of the speed of change of the amplitude. Thus, the compressor of the present invention facilitates measurement of the speed of change of the amplitude, and in this respect reference is again made to FIG. 1. If there appears in the branch connection 5 a very rapid change of amplitude then this change is initially amplified and then appears at the output terminals of the amplifier 9. Only after this signal apepars at the output of the amplifier 9 will be transferred to the auxiliary channel 10 where it is modified in the manner described. The gain of the amplifier 9 will only then be decreased by the signal in the auxiliary channel when a signal has appeared at the output of the amplifier 9.

Thus, there appears at the output of the amplifier 9 a signal $V_2$ which is represented in FIG. 8 as a function of time. The output signal initially rises to a peak value 41 and thereafter falls-off to a steady flow voltage 42 which corresponds to the stationary degree of compression or gain of the given input voltage $V_1$. The voltage difference between the potential levels 41 and 42, which in FIG. 8 has been designated by the reference numeral D, is now a function of the speed of change of the amplitude. Shortly hereafter it will be more fully explained how this so-called "overshot" can be gainfully employed for distinguishing or evaluating various phonetic elements.

In the compressor of FIG. 2, the signal is tapped-off in front of the amplifier 29, and before the input of the amplifier 29 there is connected a delay line 34. Depending upon the setting of the delay line 34, the modified control signal will appear in the auxiliary channel 30 before, simultaneously, or after the signal to be controlled has reached the control amplifier 29, so that the steady state condition may be reached quickly or slowly. If the delay line 34 is set at a high delay then there results, for example, the curve shape indicated by the curves 43 and 44. The exact form of the curve can thus for example be exactly regulated by the time constant of the delay line 34. As shall be explained more fully hereinafter, both types of compressors, that is to say, the forward controlled and the feedback compressor can be employed for analyzing the wave train of e.g. human speech.

Figure 9:
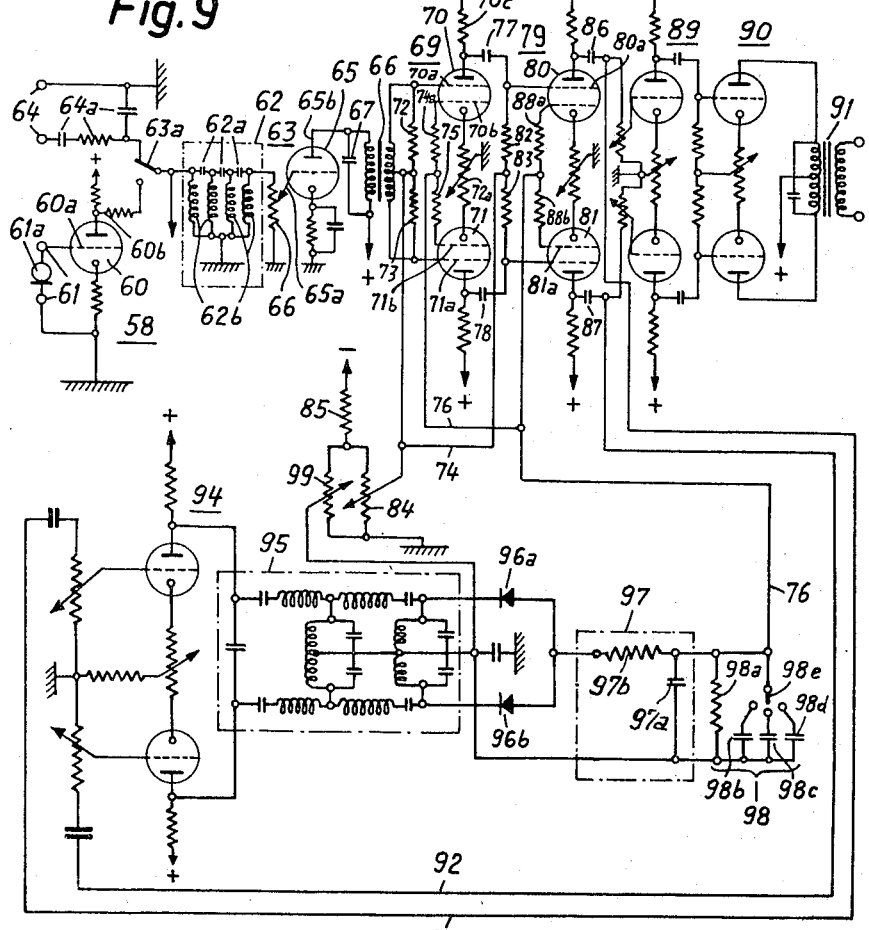
FIG. 9 is a circuit diagram of the feedback controlled compressor shown in FIG. 1.

In FIG. 9 there is illustrated the circuit diagram for a compressor of the type decribed and shown with respect to FIG. 1. The preamplifier 58 which corresponds to the preamplifier 2 of FIG. 1, is provided with an amplifying tube 60 to whose grid 60a a microphone 61a is adapted to be connected via a pair of first input terminals 61. The anode 60b of the amplifying tube 60 is connected to a high-pass filter 62 which corresponds to the high-pass filter 8 shown in FIG. 1. The high-pas filter 62 is constructed in a known manner from the series connected capacitors 62a and the parallel connected inductors 62b, which can be correspondingly dimensioned to the desired passing range. The input of the high-pass filter 62 can be connected to a second pair of input terminals 64 by means of a switch 63a to which, for example, a tape recorder or the like can be connected. In order to correct the frequency function, for example, at the outlet of a tape recorder correcting members 64a are provided. The output of the high-pass filter 62 is connected to a first amplifying stage 63 of the controlled amplifier. This first amplifying stage 63 functions as a preamplifier and is not controlled. It consists of a tube 65 having a grid 65a connected to the tap of a potentiometer 66. The potentiometer 66 is connected between the output of the high-pass filter 62 and ground. By means of the potentiometer 66 it is possible to regulate the amplitude of the signal transmitted to the controlled amplifier. The anode 65b of the tube 65 is connected to the positive pole of a direct current voltage source through the primary winding of a transformer 66, with the negative pole of said voltage source being connected to ground (not shown). In parallel with the primary winding of the transformer 66 there is arranged a capacitor 67 which together with said primary winding forms a low-pass filter in order to eliminate very high frequencies over 8000 c.p.s., for example. In the analysis of speech frequencies above this value are generally unimportant.

The secondary winding of the transformer 66 represents the input to a first controlled push-pull amplifier stage generally designated by reference numeral 69. In this push-pull amplifier stage 69 there are provided a pair of control tubes 70 and 71, the cathodes of which are connected with one another by a potentiometer 72a, whereby the tap of this potentiometer is connected to ground.

By means of the potentiometer 72a it is possible to control the balance of the push-pull amplifier stage 69. The terminals of the secondary winding of the transformer 66 are connected with the control grids 70a and 71a of the tubes 70 and 71, respectively. In order to obtain a direct current bias voltage for these grids such are connected with a conduit 74 via the resistors 72 and 73 which, in turn, are connected to the tap of a potentiometer 84. The controlling signal for regulating the gain is transmitted to the gain regulating grids 70b and 71b of the tubes 70 and 71 by means of resistors 74a and 75, respectively, which are connected to the line 76. The controlling voltage is produced in the auxiliary channel, as will be more fully described hereinafter.

To the anodes of the tubes 70 and 71, each of which is connected via a resistor 70c and 71c, respectively, with the positive pole of the direct current voltage source, there is connected a respective capacitor 77 and 78. The amplified push-pull signal passes through the capacitors 77 and 78 to the control grids of the two tubes 80 and 81 of the subsequently arranged amplifier stage 79, which likewise operates as a push-pull amplifier. The push-pull amplifier stage 79 is similarly constructed as the first push-pull amplifier stage 69, so that a further description thereof can be dispensed with. It is to be mentioned, however, that the second push-pull amplifier stage 79 is regulated in the same manner as the first push-pull amplifier stage 69. The control grids 80a and 81a of the tubes 80 and 81 of the amplifier stage 79 are connected via the resistors 82 and 83, respectively, to the conduit or line 74, which also transmits the adjustable grid bias voltage for the tubes 70 and 71 of the first push-pull amplifier stage 69. In a similar manner, the gain regulating grids of the tubes 80 and 81 provided for regulating the gain are connected to the conduits 76 by means of the resistors 88a and 88b, respectively, which is fed with the signal emanating from the auxiliary channel, which will be further described in detail shortly hereinafter.

As previously mentioned, the conduit 74 is connected to the tap of a potentiometer 84, one terminal of which is connected to ground and the other terminal of which is connected via a resistor 85 with the negative pole of a voltage source, the positive pole of which is connected to ground. By means of the potentiometer 84 it is possible to adjust the negative bias voltage of the control grids of the tubes 70 and 71 of the push-pull amplifier stage 69 as well as those of the tubes 80 and 81 of the push-pull amplifier stage 79.

At the respective anodes of the tubes 80 and 81 the input push-pull signal for the auxiliary channel is tapped-off by means of the respective capacitors 86 and 87. Additionally, there is connected to the capacitors 86 and 87 a further push-pull amplifier stage 89 to which there is connected a power push-pull amplifier stage 90. Both of the push-pull amplifier stages 89 and 90 are constructed in a manner familiar to the art so that a detailed description thereof can be dispensed with. Connected to the anodes of both of the push-pull coupled tubes of the power amplifier stage 90 is the primary winding of an output transformer 91, at the secondary of which there appears the compressed signal.

The push-pull signal appearing at the anodes of the tubes 80 and 81 is transmitted via the conduits 92 and 93 to a single stage push-pull amplifier 94. The push-pull amplifier 94 corresponds to the amplifier 10a appearing in FIG. 1. The anodes of the respective tubes of the amplifier 94 which are coupled in push-pull relationship are connected with a band-pass filter 95 corresponding to the band-pass filter 11 of FIG. 1, and in the known manner is composed of inductors and capacitors. As already mentioned with regard to FIGS. 1 and 3, the passing range of the band-pass filter 95 begins above the beginning of the passing range of the high-pass filter 62. The output terminals of the band-pass filter 95 is connected to the rectifiers 96a and 96b which rectify the output signal of the band-pass filter 95.

Accordingly, both of the rectifiers 96a and 96b correspond to the rectifier 12 of the compressor of FIG. 1. Connected to the rectifiers 96a and 96b which produce a negative signal is a low-pass filter 97 comprising a capacitor 97 and a resistor 97, said filter 97 corresponding to the low-pass filter 14 of FIG. 1. At the outlet of the low-pass filter 97 there is connected an integrating network 98 which consists of the resistor 98a and, for example, three capacitors 98b, 98c, and 98d, each of which may be selectively connected in parallel with the resistor 98a by means of a switch 98e.

By proper selection of the capacitors 98b, 98c, 98d it is possible to adjust the time constant. A capacitor with larger capacitance favors "overshot" due to the fact that the regulating signal is late in entering the controlled amplifiers 69, 79, while a small capacitance reduces "overshot" since the controlling signal enters these amplifier stages sooner. The integrating network 98 is connected with the line 76 and thus supplies the voltage which controls the gain of the push-pull amplifier stages 69 and 79. By means of a potentiometer 99 which is connected in parallel with the potentiometer 84 it is possible to supply a constant grid bias voltage to the gain control grids of the tubes 70 and 71 as well as to those of the tubes 80 and 81. This grid bias voltage which is adjustable by means of the potentiometer is supplied to the line 74 through the intermediary of the resistor 98a.

The function of the described compressor should be readily apparent. If a signal with a high amplitude and a frequency which lies within the passing range of the filter 95 is supplied to the amplifying stages 69 and 79 constituting the control amplifier, there also appears at the output of the high-pass filter 95 a signal of large amplitude. This signal is rectified by the rectifiers 96a and 96b in such a manner that there results a direct current signal which is proportional to the amplitude. The voltage of this signal is negative with respect to ground by suitably poling the rectifiers 96a and 96b. This signal is now fed to the respective gain control grids of the tubes 70, 71 and 80, 81 and correspondingly reduces the gain. The electrical circuit shown in FIG. 9 works in a similar manner to that previously described with reference to FIGS. 1–3.

In FIGS. 1–9 there have been shown amplitude compressors wherein the controlling signal possesses a different frequency function from the controlled signal. As has previously been mentioned, it is equally possible to expand the amplitude as a function of the frequency. However, in such a case it will be necessary to insert a suitable inverter in the conduit 76 of the circuit of FIG. 9. The compression will then be reduced and the amplification increased when a signal within the passing range of the filter 95 is transmitted to the auxiliary channel. Finally, it should be mentioned that the filter with a passing range in higher frequencies could be connected to the main channel, for example, of the compressor $C_1$ shown in FIG. 1, whereas the filter with a passing range in lower frequencies will be arranged in the auxiliary channel. In such a variant form of the invention a single frequency component of a lower frequency will be relatively more amplified in comparison with a corresponding component of a higher frequency.

Figure 10:
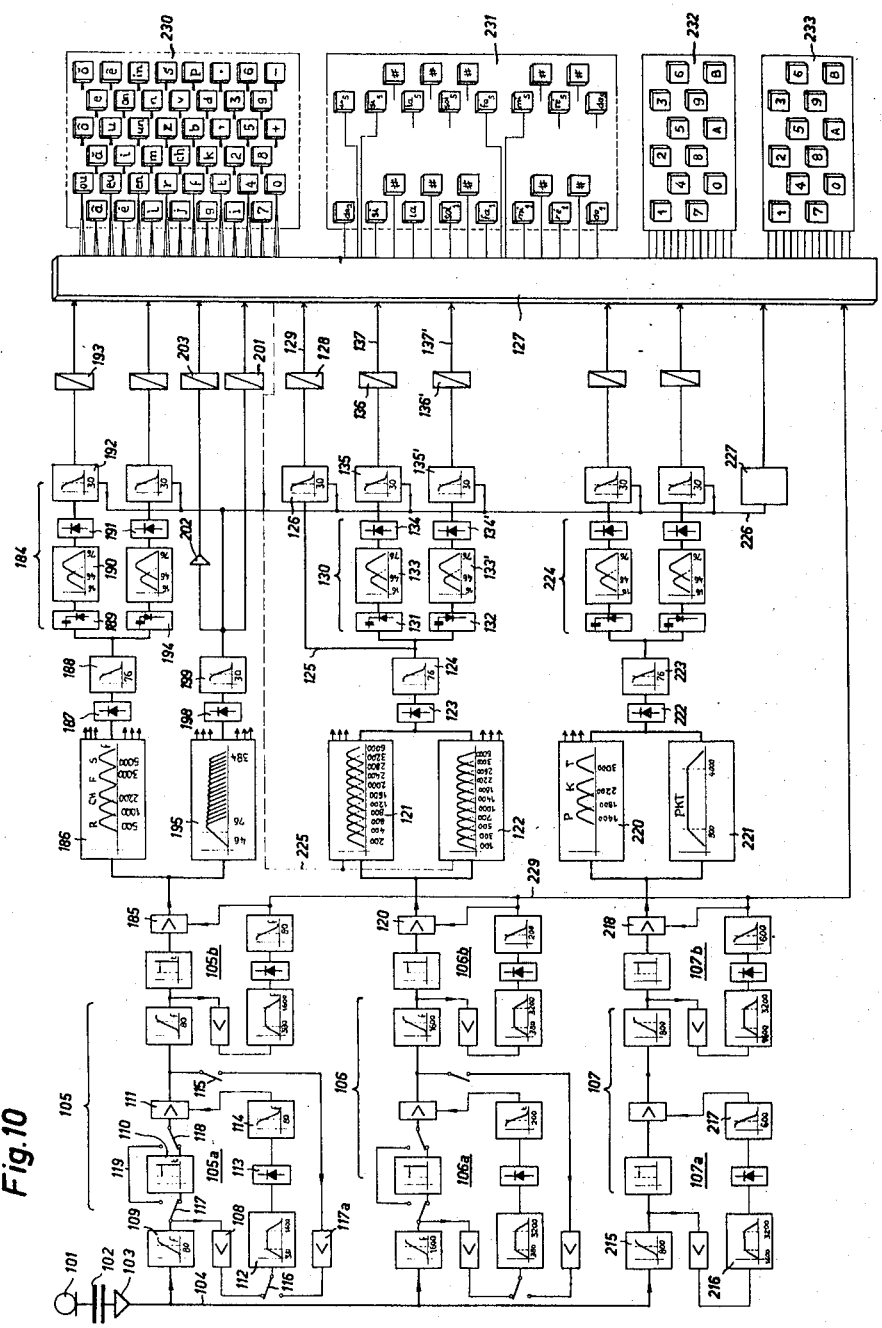
FIG. 10 is a block diagram of a sound actuated device employing the compressor structure of the present invention.

FIG. 10 is a block diagram of an apparatus adapted for analyzing human speech and comprises six compressors of the type shown in FIGS. 1, 2 and 9. More specifically, this figure illustrates an apparatus for isolating components of the electrical signals derived from a microphone for example, and wherein such signals are characteristic of the different phonetic sounds. The illustrated apparatus can, for example, be employed to actuate a printer such as a typewriter, wherein the typewriter is provided with actuatable keys which correspond to the spoken sounds.

In a similar manner as previously described with regard to FIGS. 1 and 2, a microphone 101 is connected by means of a capacitor 102 to a preamplifier 103. The output terminals of the preamplifier 103 are connected by a connecting line 104 with three compressor arrangements 105, 106 and 107. The three compressor arrangements differ from one another in the first instance by their regulating time. For example, the compressor arrangement 105 may respond slowly, the compressor arrangement 106 may have an intermediate response time, and the compressor arrangement 107 may respond quickly. The response time of the respective compressor arrangements 105, 106 and 107 may be, for example, in the order of 10, 3 and 1 milliseconds. Each compressor arrangement 105, 106 and 107 consists of two serially connected compressors of the type described in FIGS. 1, 2 and 9. The utilization of two series connected compressors may become necessary if a single compressor is not capable of effecting the compression to a desired degree without distorting the signal to be compressed.

The first compressor 105a of the compressor arrangement 105 contains a high-pass filter 109, a delay line 110 and a controlled amplifier 111. The controlling signal for the controlled amplifier 111 is produced in the auxiliary channel which contains an amplifier 108, a band-pass filter 112, a rectifier 113 and a low-pass filter 114. The just described compressor is forward controlled since the input signal for the amplifier 111 is taken off the output terminals of the first high-pass filter 109.

In order that the compressor 105a may, if desired be feedback controlled there are provided the switches 115 and 116 by means of which the input terminals of the band-pass filter 112 can be connected to the output terminals of a further amplifier 117a. Consequently, the input of the amplifier 117a may be connected to the output terminals of the controlled amplifier 111 by means of the switch 115. Additionally, there are provided two switches 117 and 118 which permit by-passing the delay line 110 by means of a shunt 119.

The serially connected compressor 105b is essentially similarly constructed as the previously described compressor 105a whereby, however, there is not shown the alternative switching possibility for a feedback control. As a result, a further description of the second compressor 105b is not believed to be necessary. The remaining compressor arrangements 106, 107 likewise consist of two serially connected separate compressors 106a, 106b and 107b, which are essentially similar in construction to the compressor arrangement previously described. To more fully explain the illustrated arrangement, reference is made to the portion of the circuit diagram which is connected to the second compressor 106b of the compressor arrangement 106. At the output terminals of the controlled amplifier 120 of the compressor 106b there is connected a plurality of formant filters which are parallel to one another, generally designated by the blocks 121 and 122. For example, there are collectively provided twenty separate formant filters, with the frequency range of these filters, for example, being in the order of 80 c.p.s. to 6000 c.p.s.

The filters appearing in the blocks 121 and 122 are constructed as formant or band-pass filters with the middle passing frequency of each individual filter being numerically designated within its associated block. These filters correspond to the filters 16a, 16b, etc. and 17a, 17b, etc. previously described in the explanation of FIGS. 1 and 2. At the output terminals of each of these formant filters there is serially connected a rectifier 123 and a low-pass filter 124. At the output terminals of the low-pass filter 124 there appears a signal when the wave train transmitted through the amplifier 120 contains a frequency component corresponding to the band range of the respective formant filters. For simplicity in illustration, the elements preferably appearing at the output terminals of each of the twenty formant filters has only been shown once. Thus, to each formant filter there is connected a rectifier 123 and to each rectifier 123 there is connected a low-pass filter 124, the passing range of which terminates at 76 c.p.s for example.

The output terminals of each of the low-pass filters 124 is connected via a conduit 125 and, if desired, by means of a further low-pass filter 126 to an analog-digital converter 128. In this converter the information entering as an analog signal is changed to digital information. The incoming analog signal is tested in order to determine in which one of preferably three level ranges it is to be classified. A strong signal can be classified in a high level range "2," an intermediate signal can be classified in an intermediate level range "1," whereas a weak or non-present analog signal can be classified in the weak level range "0." The information converted into digital form is supplied by means of a conduit 129 to a logic system 127, which evaluates the given information and determines which type key corresponding to the spoken sound is to be actuated. As explained, by means of the formant filters 121 and 122 it is possible to ascertain those formants which are characteristic for the quasi-stationary parts of a particular sound. For example, the characteristic second formant $II_n$ (FIG. 4) for the sound "n" is permitted to be passed through the formant filter of the frequency of 2600 c.p.s., so that a corresponding digital signal is supplied to the logic system 127. The logic system 127 can thus determine due to the presence of a formant in the frequency range of 2600 c.p.s.—if necessary in combination with further characteristic criteria for the "n"—that this sound is present and transmits the corresponding information. It is to be appreciated that the characterization, i.e. of the sound "n" practically only is possible by standardizing or normalizing the level of its second formant $II_n$ by means of a controlled compressor of the type described hereinbefore.

The output terminals of each low-pass filter 124 is connected to a sub-formant unit 130 which is designed to determine the sub-formant. The sub-formant is a signal representing the speed of change of the amplitude of the rectified signal representing the formant. The sub-formant, or in other words, the degree of ascending and descending of the slope of a signal is a characteristic feature of some sounds. For example, the sound "t" may be characterized by a steep surge of the amplitude, as can readily be seen from the curves of FIGS. 5 and 6. Concerning the significance of the sub-formant reference is made to my United States Patent 2,540,660 issued February 6, 1951, and to the Swiss publication, "Phonétographe et Subformants," appearing in the Bulletin Technique PTT, February 1957.

The sub-formant unit 130 comprises two differentiating networks 131 and 132 with each unit being connected to the output terminals of each of the low-pass filters 124. By differentiation, a signal is derived from the output signal of the low-pass filter 124 with the amplitude being proportional to the speed of change of the component of the associated formant filter 121, 122. In each of the two differentiating networks 131 and 132 there is provided a rectifier which ensures that only a change of the amplitude to higher or smaller levels, respectively, is transmitted as a respective output signal. The rectifiers in the two differentiating networks 131, 132 are poled so that, for example, the differentiation network 131 transmits a signal when the amplitude of an incoming wave train increases, whereas the differentiation network 132 transmits a signal when the amplitude of the wave train decreases. For the analysis of speech, in the first line the speed of increase of the amplitude is significant, if this speed lies within a certain range. In order to eliminate changes of amplitude which are not significant for the analysis of sound and further, to suppress other disturbing signals and noises, two band-pass filters connected in parallel are connected to the output terminals of the differentiating network 131. These two band-pass filters are generally designated by the block 133 and hereinafter will be referred to as "sub-formant" filters. The passing range of these sub-formant filters 133 lies for example between 16 c.p.s. and 46 c.p.s. and between 46 c.p.s. and 76 c.p.s., respectively. When the amplitude of an incoming wave train is increasing a signal proportional to the speed of change of the amplitude appears on the output terminals of the differentiating member 131. This signal excites one or both sub-formant filters 133 to oscillate. A slow increase of amplitude primarily excites the lower band-pass filter of the group 133 which is tuned to the lower frequency, while a faster increase of the amplitude creates an oscillation in both sub-formant filters 133. It is to be appreciated that the amplitude of the oscillation created in these two sub-formant filters 133 may be influenced by properly setting the time constant of the compressors 106a and 106b of the compressor arrangement 106. It is to be recognized that an overshoot 41 (FIG. 8) favors the build-up of oscillations in the sub-formant band filters 133.

The output terminals of each of the two sub-formant filters 133 are connected to a rectifier 134 which rectifies the oscillation appearing in these filters 133. The rectified signal is transmitted to a low-pass filter 135 which eliminates any A.C. voltage components which may be present in this signal. The level of the signal leaving the low-pass filter 135 is proportional to the rate of increase of the amplitude of the frequency supplied from the corresponding formant filter of the blocks 121, 122. This analog signal is transmitted to an analog-digital converter 136 which converts this analog signal into a digital signal which is then fed to the logic system 127 via a line 137.

Elements 133', 134', 135', 136' and 137' of the sub-formant unit 130 correspond to the elements 133, 134, 135, 136 and 137 previously described and likewise are connected to the output terminals of the differentiation member 132. The digital signal appearing at the output of the converter 136' is significant for indicating the rate of decrease of the amplitude of the oscillation corresponding to the passing range of the associated formant filter of blocks 121, 122. It should be noted, however, that the speed of decrease of the amplitude is not characteristic for the sounds of most languages. For the majority of purposes, therefore, it is sufficient to provide a single sub-formant filter 133', the passing range of which, however, then should comprise all frequencies between 16 c.p.s. and 76 c.p.s. Under certain circumstances, it may be possible to dispense with the discrimination of the rate of decrease of the amplitude. In such event, the members 132, 133', 134', 135', 136' and 137' can be dispensed with.

Figure 11:
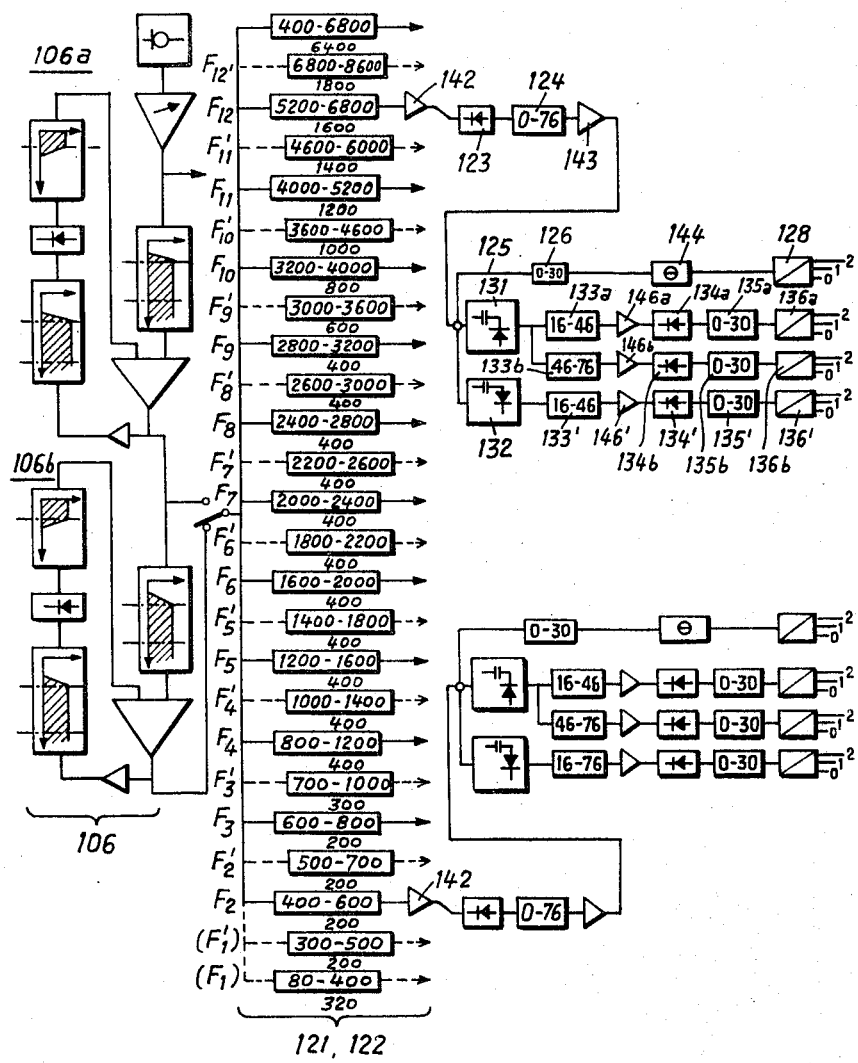
FIG. 11 is a block diagram of the quasi-fix formant and sub-formant units of the sound actuated device shown in FIG. 10.
Figure 12:
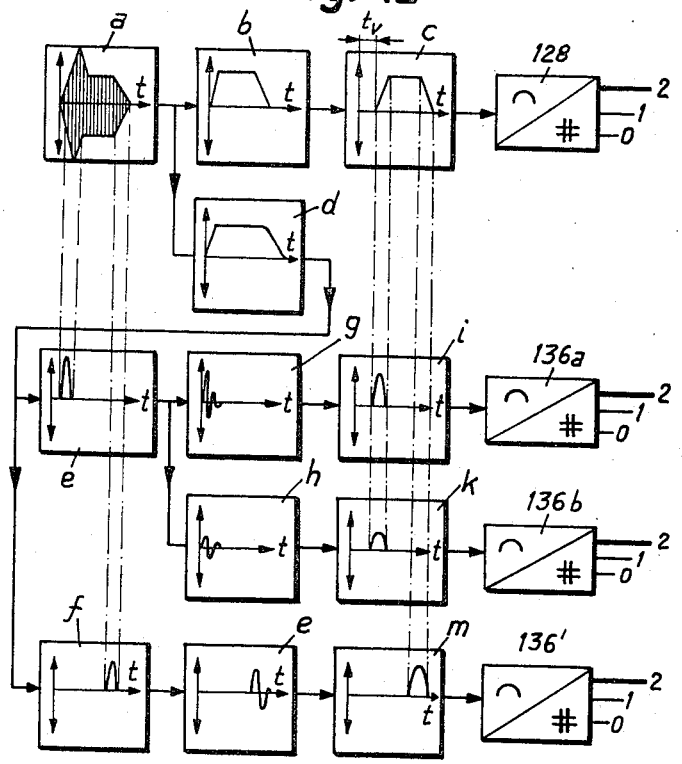
FIG. 12 is a block diagram illustrating the shape of the wave forms of the quasi-fix formants and sub-formants during processing by the formant and sub-formant units of FIG. 11.

To more clearly describe the function of the various units for the discrimination of the formants and the sub-formants reference is made to FIGS. 11 and 12, whereby FIG. 11 shows the formant filters and the members connected thereto, and FIG. 12 graphs for illustration of the function of these members. The same reference symbols are used as previously employed in FIG. 10. In FIG. 11 the compressor arrangement consisting of the two compressors 106a and 106b is again designated by reference numeral 106. The compressors have already been described in connection with FIGS. 1, 2 and 9, so that a further description can be dispensed with. Connected to the compressor 106 are e.g. a bank of 25 filters 121, 122. To the output terminals of each of the filters 121, 122 is connected an intermediate amplifier 142, two of which are shown in FIG. 11. The members connected to the output terminals of the intermediate amplifier 142 are adapted to discriminate the quasi-fix formants from which the subformants can be derivated.

The output signal of the intermediate amplifier 142 is fed to a rectifier 123 and the signal leaving this rectifier 123 is likewise supplied to a low-pass filter 124, the passing range of which lies between 0 and 76 c.p.s. The output terminals of this low-pass filter 124 are connected to a second intermediate amplifier 143. The signal leaving the amplifier 143 is transmitted via a conduit 125 to a low-pass filter 126 which has a passing range from 0–30 c.p.s. A signal, the level of which is representative of the amplitude of the formant of a speech element, or in other words, the amplitude of the components between e.g. 5200 c.p.s. and 6800 c.p.s., appears at the output terminals of the low-pass filter 126.

The signals which are significant for the spoken sound should be simultaneously supplied to the logic system 127 (FIG. 10) in order to enable this logic system to ascertain the letter to be printed or typed and corresponding to the sound. Due to the fact that the forming of the sub-formants consumes more time than the forming of the formants, a delay line 144 (FIG. 11) is provided which delays transmission of the analog signals from the low-pass filter 126 to the analog-digital converter 128. This signal which e.g. appears at the output terminals of the formant filter having a passing range between 5200 c.p.s. and 6800 c.p.s., when a sound containing a component in this frequency range is transmitted to the microphone as depicted in FIG. 12 at block a. This signal or oscillation is rectified in the rectifier 123 so that a wave shape results as seen at block b in FIG. 12. In the delay line 144 this signal is delay for a time $t_v$ as can be seen in block c of FIG. 12. The delayed analog signal is now converted into corresponding digital information in the converter 128. The signal leaving this converter 128 is an indication whether the spoken sound had a strong, intermediate or a negligible component in the frequency range of the corresponding formant filters 121, 122. The classification of the analog signals into three level ranges may be replaced in certain applications by classification into two level ranges.

To the output terminals of the intermediate amplifier 143 there is further connected the sub-formant unit 130. The differentiating members 131 and 132 are directly connected to the output terminals of the amplifier 143. The signal leaving the differentiation member 131 and representing the rate of increase of the amplitude is fed to the two sub-formant band-pass filters 133a and 133b, the passing ranges of which lie between 16 c.p.s. and 46 c.p.s. and 46 c.p.s. and 76 c.p.s., respectively. Intermediate amplifiers 146a and 146b are connected to the sub-formant band-pass filters 133a and 133b, which amplifiers in turn are connected to rectifiers 134a and 134b. The output signals of these rectifiers are supplied to low-pass filters 135a and 135b, respectively. These output signals are converted into digital information by the converters 136a and 136b.

A band-pass filter 133' is connected to the differentiation member 132 which is adapted to deliver a signal which is a function of the rate of decrease of the amplitude of the incoming signals. This band-pass filter 133' has a passing range between 16 c.p.s. and 76 c.p.s. However, such band-pass filter 133' may be replaced by two band-pass filters in parallel, the passing range of which comprises the frequencies between 16 c.p.s. and 46 c.p.s. and 46 c.p.s. and 76 c.p.s., respectively, as described in connection with FIG. 11. The signal leaving the band-pass filter 133' is amplified by an intermediate amplifier 146' and thereafter rectified by the rectifier 134'. In order to smooth the rectified signal a low-pass filter 135' is provided. The signal leaving the low-pass filter 135' is converted to a digital signal indicating in which of two or three amplitude ranges the incoming signals are to be classified.

The shape of the voltage appearing at the output terminals of the intermediate amplifier 143 is depicted in the block b of the graph of FIG. 12. The appearance of this signal after it has been differentiated by the differentiating members 131 and 132 is shown in FIG. 12 in the blocks e and f, respectively. The signal appearing in the block e excites the band-filters 133a and 133b so that these filters will oscillate. These oscillations are shown in the blocks g and h. The oscillations are rectified by the rectifiers 134a and 134b so that a positive signal remains as shown in FIG. 12 in blocks i and k. The amplitude of these signals is an indication of the speed of increase of the amplitude of the oscillations of the passing range of the corresponding formant filters 121, 122. The resulting analog signals are converted into digital information by the converters 136a and 136b which classify its amplitude according to three or two level ranges, as previously described.

As has been explained with the band-pass filters 133a and 133b, the band filter 133' likewise is excited by the signal shown in FIG. 12 in the block f so that the oscillation shown in block e appears in this filter. After rectification this signal receives the appearance depicted in the block m. The amplitude of the signal shown at m is an indication of the rate of decrease of the amplitude of the wave train supplied by the rectifier 143. As previously described, this signal is converted into digital information. The different blocks of FIG. 12 are so arranged that simultaneously appearing signals in the different members are above each other. Thus, it is to be seen, that the signals of the graphs c, i, k and m practically simultaneously reach the different associated analog-digital converters 128, 136a, 136b, and 136', so that the logic system connected to the converter simultaneously receives all information necessary to ascertain the typeletter corresponding to the spoken sound, so that for example, a suitable printer or typewriter may be accordingly actuated.

Figure 13:
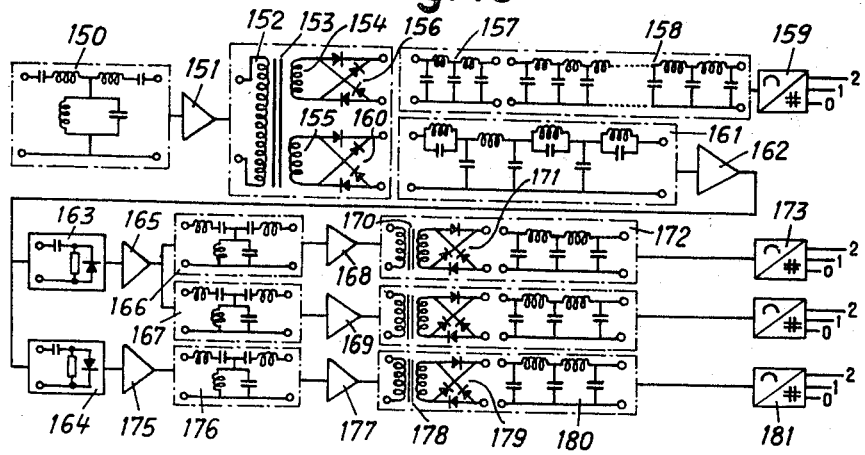
FIG. 13 is a circuit diagram of another embodiment of a formant and sub-formant processing circuit.

The circuit diagram of a somewhat modified embodiment of a formant and sub-formant unit, i.e. the unit connected with one of the formant filters 121, 122 is shown in FIG. 13. The formant filter is designated with the reference symbol 150. Connected to this filter 150 is an intermediate amplifier 151, the output terminals of which are connected with the primary winding 152 of a transformer 153. This transformer 153 contains two secondary windings 154 and 155, the first of which 154 is provided to transmit the signal from which the formants will be derived, while the secondary winding 155 transmits the signal from which the sub-formants are derivated. A full wave rectifier 156 is connected to the output terminals of the secondary winding 154. The signal rectified by the rectifier 156 is supplied to a low-pass filter 157 which fulfills the function of the low-pass filter 126 (FIG. 11), and the passing range of which ends at 30 c.p.s. The output signal of this low-pass filter 157 is fed to an analog-digital converter 159 via a delay line 158. The delay line 158 may be constructed similar to the low-pass filter 157 and delays the transmission of the signal to the converter 159, as has already been described in connection with FIG. 12.

The secondary winding 155 of the transformer 153 is connected to a rectifier 160, the output signal of which is passed through a low-pass filter 161, the passing range of which ends at 76 c.p.s. The output voltage of the low-pass filter 161 is fed to the differentiation networks 163 and 164 via an intermediate amplifier 162. As previously described, each of the two differentiation networks 163, 164 is provided with a rectifier so that e.g. the differentiation network 163 is sensitive only to a positive amplitude change, while the differentiation network 164 only is sensitive to negative amplitude changes. The output signal of the differentiation network 163 is amplified by an amplifier 165 and, thereafter, supplied to two sub-format filters 166 and 167, the passing range of which lies between 16 c.p.s. and 46 c.p.s. and 46 c.p.s. and 76 c.p.s., respectively. These filters correspond to the sub-formant band-pass filters 132a and 132b of the embodiment of FIG. 11. Both band-pass filters 166 and 167 are connected to amplifiers 168 and 169, respectively. The output signal of the amplifier 168 next passes through the primary and the secondary winding of a transformer 170, a rectifier 171, and a low-pass filter 172 having a passing range between 0 and 30 c.p.s. The output terminals of the filter 172 are connected to an analog-digital converter 173 which, in turn, is connected to the logic system 127. Corresponding members are provided for the signal appearing at the output terminals of the amplifier 169.

The differentiation network 164 for discrimination of the decreasing slope of the amplitude of an oscillation is connected to an amplifier 175, which in turn is connected to a sub-formant band-pass filter 176, the passing range of which comprises a frequency band between 16 c.p.s. and 76 c.p.s. This band-pass filter 176 corresponds functionally to the band-pass filter 133′ (FIG. 11). After leaving this filter 176 the transmitted signal passes successively through the intermediate amplifier 177, the transformer 178, the rectifier 179, the low-pass filter 180 and the analog-digital converter 181. The digital signal at the output terminals of the converter 181 contains information representative of the decreasing slope of the wave train.

The difference between the embodiments of FIGS. 11 and 13 consists in the fact that the formant unit and the sub-formant unit are separated from each other at the output terminals of the amplifier 151 in the embodiment of FIG. 13, whereas in FIG. 11 the separation between formants and sub-formants is provided at the output terminals of the amplifier 143, so that the rectifier 123, the low-pass filter 124 and the amplifier 143 are common to both units. While both modifications have practical advantages the embodiment of FIG. 11 is extremely advantageous due to the comparative reduction of costs.

As previously mentioned there must be provided, for example, 10 or more formant filters in order to effectively separate the frequency components for the different sound elements of speech. The selection of the passing ranges of the different formant filters should correspond to the sounds which are to be distinguished. More specifically, it is possible to distinguish between three frequency groups. The first frequency group comprises the range between about 400 c.p.s. and 1200 c.p.s. This band serves for example the purpose to distinguish between the spoken sounds "o," "r" and "a" and preferably contains the following three band-pass filters:

$F_2$ with a passing range between about 400 c.p.s. and 600 c.p.s.

$F_3$ with a passing range between about 600 c.p.s. and 800 c.p.s.

$F_4$ with a passing range between about 800 c.p.s. and 1200 c.p.s.

The second frequency group comprises the frequencies between about 800 c.p.s. and 2000 c.p.s. and serves to distinguish for example the sounds "a," "õe" and "ε̃," which correspond to the French sounds "A," "UN" and "IN."

This second frequency group is preferably divided into three ranges corresponding to the following three filters:

$F_4$ with a passing range between about 800 c.p.s. and 1200 c.p.s.

$F_5$ with a passing range between about 1200 c.p.s. and 1600 c.p.s.

$F_6$ with a passing range between about 1600 c.p.s. and 2000 c.p.s.

It is to be seen that each of these filters embraces a frequency band range of about 400 c.p.s.

The third frequency group comprises the frequencies between about 2000 c.p.s. and 3200 c.p.s., wherein likewise each filter embraces a frequency band of about 400 c.p.s. This third group serves to distinguish the phonetic sounds "l," "m" and "n," and more specifically contains the following three formant filters:

$F_7$ with a passing range between about 2000 c.p.s. and 2400 c.p.s.

$F_8$ with a passing range between about 2400 c.p.s. and 2800 c.p.s.

$F_9$ with a passing range between about 2800 c.p.s. and 3200 c.p.s.

It is to be understood that preferably still other formant filters are provided which allow detection of very fine distinguishing characteristics of similar sounds. An example of an arrangement of the formant filters can be seen from FIG. 11, wherein the numerical values of the passing ranges of the different formant filters have been given. It should be mentioned, however, that it also is possible to provide formant filters with overlapping passing ranges. In FIG. 11 there is also shown a plurality of formant filters designated with a prime, such as filters $F_1'$, $F_2'$, etc. All of these formant filters collectively i.e. filters with and without a prime marking constitute an overlapping arrangement of the frequency band between 80 c.p.s. and 6800 c.p.s. In certain instances it is desirable to additionally provide a filter which covers the entire passing range, as for example, from 400 c.p.s. to 6800 c.p.s. as depicted by the uppermost filter appearing in FIG. 11.

The device of FIG. 10 as far as described relates to the derivation of signals which are indicative of the presence and the level of certain harmonic components or formants, and further for the presence and level of sub-formants. The formants which pass through the various formant filters of the groupings 121, 122 may be considered as "quasi-fix" i.e. they do not change very much when the fundamental frequency changes.

In addition to the already mentioned formants and sub-formants other characteristic elements should be derived from the incoming wave train to facilitate distinguishing similar sounds.

The controlled amplifier 195 (FIG. 10) of the second compressor 105b of the compressor arrangement 105 is connected to a group of parallelly arranged formant filters 196. The output terminals of each of these formant filters 186 is connected to a rectifier 187 which, in turn, is connected to a low-pass filter 188. Each low-pass filter 188 supplies its output signal to a sub-formant unit 184 which includes a differentation network 189 having a rectifier connected in parallel to a resistor (not shown) of this network. As previously described, this rectifier serves to suppress one-half of the wave so that the signal appearing at the output terminals of the network 189 indicates a positive change of the amplitude. Connected to the differentiation network 189 are a pair of sub-formant filters 190. The passing range for example of the first filter of said filter pair has a passing range between about 16 c.p.s. and 46 c.p.s. and the remaining filter a passing range between about 46 c.p.s. and 76 c.p.s. Connected to each of these filters is a rectifier 191 connected to a low-pass filter 192, the passing range of which lies between 0 c.p.s. and 30 c.p.s. The output terminals of the low-pass filter 192 is connected to the logic system 127 via an analog-digital converter 193.

Figure 14:
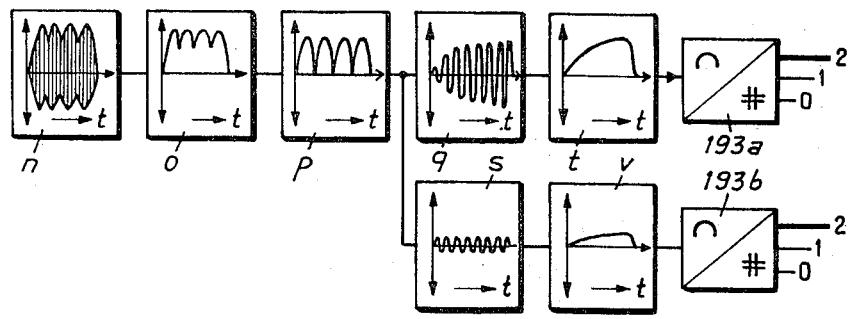
FIG. 14 is a block diagram showing the shape of the sub-formants during processing in a sub-formant unit of the sound actuated device shown in FIG. 10.

To more clearly describe the function of the elements 186–193 it should be noted that the sounds "r" (rolled), "ch," "f" and "s" may be characterized by a fluctuation. This fluctuation may be considered to be a modulation of a carrier by a relatively low frequency. The formant filters 186 are tuned to the carrier frequency, while the fluctuation or modulation is detected by the associated subformant unit 184. The form of the oscillation which may appear e.g. at the output terminals of the formant filter 186 is depicted in the block *n* of FIG. 14. The carrier of this oscillation is rectified by the rectifier 187 so that the signal receives the appearance shown in the block *o* of FIG. 14. By differeniation in the differentiating network 189, the changes of the amplitude become more pronounced so that the signal receives the appearance as shown in the block *p* of FIG. 14. The pulses of this signal now excite the two band-pass filters 190 and cause them to oscillate. The modulation may be e.g. for the rolled sound "r," such that primarily the bandpass filter of the filter group 190 having the lower passing range which lies between 16 c.p.s. and 46 c.p.s. is excited. The resulting oscillation is shown in FIG. 14 in the block *q*

Simultaneously the band-pass filter with the higher passing range between 46 c.p.s. and 76 c.p.s. is excited. The resulting oscillation, however, has a considerably lower amplitude than the oscillation in the lower passing range filter, as shown in the block *s* of FIG. 14. The two signals leaving the lower and higher range band filters 190 are rectified by the two full wave rectifiers 191, so that the signals receive the respective shapes shown in blocks *t* and *v* of FIG. 14. The illustrated signals pass through the respective analog-digital converters 193*a* and 193*b* which converts analog signals into digital information. When, for example, a signal with the classified level "2" appears at the converter 193*a*, which is connected to the formant or band-pass filter 186 with a frequency range between 400 c.p.s. and 600 c.p.s. this can be considered to be an indication of the presence of the rolled "r" sound.

Connected to the low-pass filter 188 is a second differentiation network 194 which is generally constructed similar to the differentiation network 189. The network 194, however, creates a signal which is an indication of the negative amplitude changes of the amplitude. Since the elements associated with the differentation network 194 are basically identical to the corresponding members connected to the differentiation network 189, no further description thereof is thought to be necesary. It should be noted, however, that the information content of the signal delivered by the members connected to the differentiation member 194 is of less importance since the presence and the frequency of fluctuations is also detected by the elements 189–193.

It is to be appreciated that the derivation of a signal representing the fluctuation or modulation of a sound is facilitated by the large time constant of for example 10 milliseconds of the compressors 105*a* and 105*b* of the compressor arrangement 105. Due to this large time constant, an overshot appears which increase the fluctuation, so that e.g. the modulation of 30 c.p.s. of the rolled "r" is recognizable.

A further group of formant filters 195 is connected to the compressor arrangement 105. This group of formant filters 195 serves to determine the so-called mobile formants or variable components between 76 c.p.s. and 384 c.p.s. These formant filters 195 for the mobile formants further permit determination of the fundamental frequency.

Figure 15:
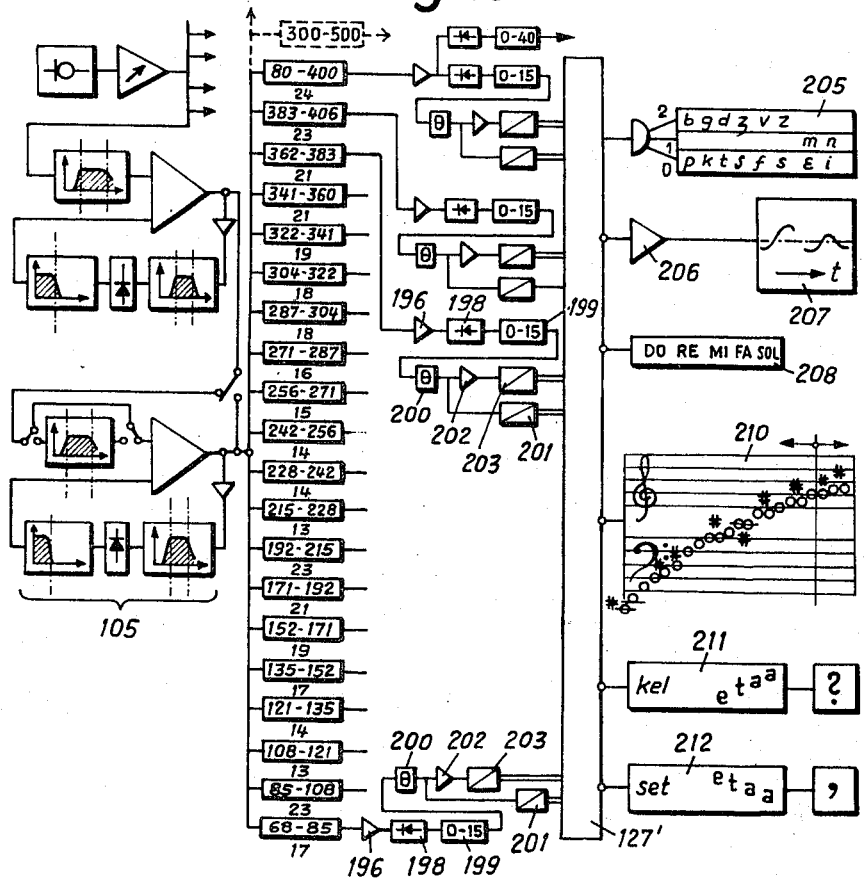
FIG. 15 is a block diagram showing the arrangement of the mobile formant filters and compressor for obtaining information corresponding to the fundamental frequency of the sound.
Figure 16:
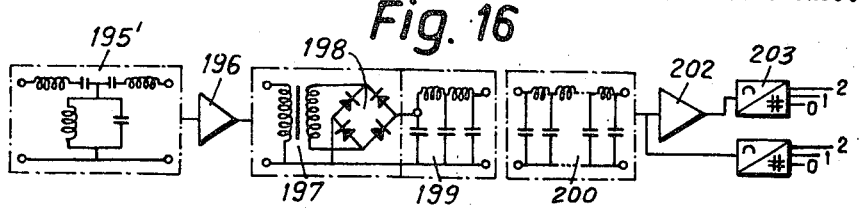
FIG. 16 is a wiring diagram showing in detail a portion of the circuit arrangement shown in FIG. 15.

The formant units connected to each of the formant filters 195 will now be described in conjunction with FIGS. 15 and 16, in which similar elements are designated with the same reference numerals as in FIG. 10. Connected to a formant or band-pass filter 195′ (FIG. 16) is an amplifier 196 which is connected to the primary winding of a transformer 197. The secondary winding of the transformer 197 is connected to a full wave rectifier 198 which, in turn, is connected to a low-pass filter 199, the passing range of which lies between 0 c.p.s. and 15 c.p.s.' The signal leaving the low-pass filter 199 is fed to an analog digital converter 201 via a delay line 200. The output terminals of the delay line 200 are connected to a second analog-digital converter 203 via amplifier 202. For a clearer understanding of the function of the formant unit shown in FIG. 16, it is to be appreciated that the determination of the fundamental frequency of the speaker is advantageous in many respects. It has been discovered that the characteristic quasi-fix frequencies of the higher formants of all vowels and similar sounds are to a certain extent a function of the fundamental frequency. It is, therefore, extremely advantageous to determine the fundamental frequency so that for example in the logic system 127 a correction may be effected in accordance with this fundamental frequency, in order that a certain sound may also be identified when the frequency of the characteristic formant has changed. Further, the fundamental frequency may be used to determine the pitch of the sound. Finally, the changes of the fundamental frequency may be used to determine e.g. the proper setting of punctuation marks such as a question mark, comma, periods and so forth.

The fundamental frequency is often disturbed by strong components of higher frequencies so that a determination of the fundamental frequency for example by means of a tuned oscillating circuit is not generally possible. In the arangement shown in FIG. 16, the fundamental frequency is determined by sampling all the outputs of all converters 201 associated with the formant filters 195, and determining the lowest band range of any of the formant filters 195 which has a digital signal of "1" or "2" at the convertor 201. It then can be assumed that the fundamental frequency falls in the range of the formant filter having the previously described lowest band range. If, for example, the analog-digital converter 201 of the formant filter which has a passing range between 108 c.p.s. and 121 c.p.s. is the lowest frequency range which delivers a signal corresponding to the level "1" or "2" just described, then it can be assumed that the fundamental frequency falls in this range i.e. 108 c.p.s. to 121 c.p.s.

Figure 17A:
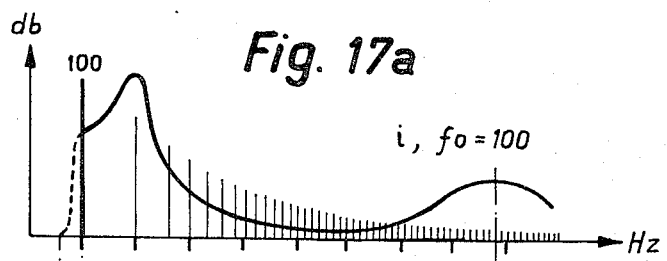
FIGS. 17a–17d illustrates spectrograms of various sounds when possessing different fundamental frequencies.
Figure 17B:
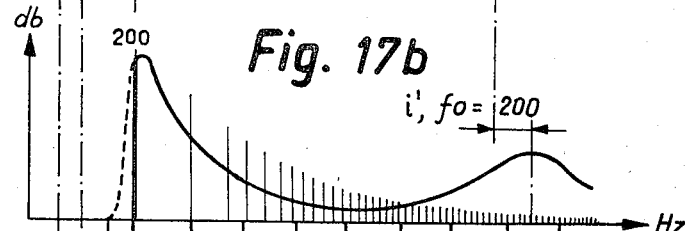

To more fully describe the function of the amplifier 202 and of the analog-digital converter 203, reference is made to FIGS. 17*a*–17*d* which show the frequency distribution of the components of four spoken sounds. FIG. 17*a* illustrates the spectrum of the phonetic sound "i" at a fundamental frequency $f_0 = 100$ c.p.s. It is to be seen from FIG. 17*a* that there are no components of the sound below the fundamental frequency of 100 c.p.s. The same fact may be observed upon inspection of FIG. 17*b* which shows the spectrum of the same sound "i," however, at a fundamental frequency of $f_0 = 200$ c.p.s. Upon comparison of FIGS. 17*a* and 17*b* it is to be seen that the characteristic second formant is shifted somewhat towards a high frequency in FIG. 17*b* relative to the second formant in FIG. 17*a*. Thus, it is to be seen that the higher formants are shifted to higher frequencies when the fundamental frequency increases.

Figure 17C:
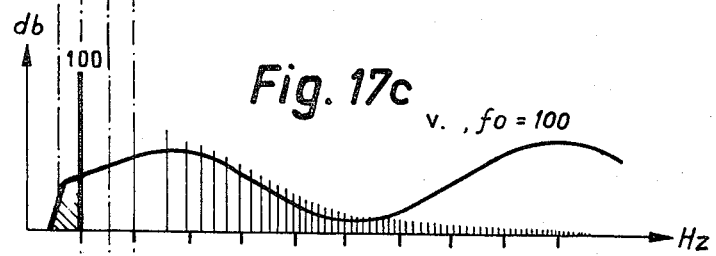
Figure 17D:
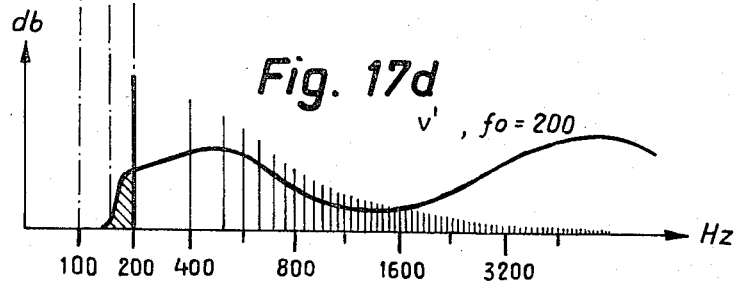

FIG. 17*c* shows the spectrum of the sound "v" spoken at a fundamental frequency of $f_0 = 100$ c.p.s., and FIG. 17*d* the spectrum of the same sound spoken at a fundamental frequency of $f_0 = 200$ c.p.s. Again, it is to be seen that the second formant is shifted towards a higher frequency when the fundamental frequency rises. Due to this shifting, it is desirable to provide a correction which is a function of the fundamental frequency.

Further, as can be seen from FIGS. 17*c* and 17*d* in the spectrum of the phonetic sound "v" for example it was surprisingly discovered that there appears a relatively small component below the fundamental frequency which is extremely useful for further distinguishing many sounds. The range of this frequency appears with hatched lines in FIGS. 17*c* and 17*d*. It is to be noted that the component below the fundamental frequency, which hereinafter is conveniently referred to as the "follower formant," follows the fundamental frequency. Consequently, the follower formants if present are always in the frequency range immediately below the fundamental frequency irrespective of the absolute frequency value.

The mentioned follower formants are particularly useful in distinguishing a certain group of sounds from one another, especially the voiced transient or fluctuated sounds, like "j", "d", "v", "b", "d", "g." In order to receive a signal which is dependent upon the follower formants the amplifier 202 is provided which amplifies the output signal of the delay line 200. When a signal appears at the output terminals of the converter 203 of that formant unit, the formant filter of which corresponds to a frequency range immediately below the frequency range of the fundamental frequency, this is an indication of the presence of a follower formant.

It should be noted that the output terminals of the compressor arrangement 105 may also be connected with a further group of formant filters in the range between 400 c.p.s. and 6000 c.p.s. Due to the fact that a set of formant filters of this band range is also connected to the compressor arrangement 106, the signals corresponding to the quasi-fix formants appear twice. However, they are transmitted by the compressors 105 and 106 having different time constants. The last low-pass filters at the output of the formant unit, for this second set of formant filters, may have a lower upper limit such as 15 c.p.s. instead of 30 c.p.s.

The analog-digital converters 201 and 203 are connected to a logic system 127' which may be considered to be a part of the logic system 127 shown in FIG. 10. The information supplied to the logic system 127' first of all permits distinguishing between the sound pairs shown above one another at 205 of FIG. 15 by means of these follower formants. Besides this, the logic system 127' delivers information for the actuation of other operable members 207, 208, 210, 211, 212 adapted to be actuated by sound. Thus, it is possible to obtain a signal via an amplifier 206 which is a function of the variation of the fundamental frequency, as indicated at 207. Further, there may be derived information which allows controlling the keys of a typewriter in such a manner that the tone of the ground frequency is typed with letters, as for example shown at 208. Still another possibility is to use the information which is a function of the fundamental frequency and to control therewith the position of the type on the paper, as with musical notes. For example, the information may be used to control the angular position of a platen of a typewriter so that it is possible to print musical notes on the paper in dependance upon the fundamental frequency, as schematically shown at 210. Finally, the melody of a spoken sentence which is determined by the change of the fundamental frequency may be used to obtain information concerning the setting of punctuation marks, as diagramatically shown at 211 and 212.

The compressor arrangement 107 (FIG. 10) possesses a very small time constant. The time constant may be, for example, 1 millisecond. The compressor arrangement 107, therefore is adapted to detect comparatively fast changes of the signal to be analyzed. In connection with the compressor arrangement 107 it is thus possible to form signals which are indicative for fast sounds e.g. the sounds "p," "t" and "k," and further to distinguish between these "explosives" or "stop-sounds." Since the compressor arrangement 107 only has to detect fast changes of the incoming signal, the passing range of the high-pass filter 215 in the main channel of the compressor 107a begins at 800 c.p.s. Correspondingly higher begins the passing range of the band-pass filter 216 in the auxiliary channel of this compressor 107a. The passing range of this band-pass filter 216 may lie between 1600 c.p.s. and 3200 c.p.s. The passing range of the low-pass filter 217 of the auxiliary channel lies, for example, between 0 c.p.s. and 600 c.p.s. Connected to the output terminals of the controlled amplifier 218 of the second compressor 107b of the compressor arrangement 107 are, for example, four formant filters 220. The mean value or middle of the respective passing ranges of the four filters 220 preferably lies at about 1400 c.p.s., 1800 c.p.s., 2200 c.p.s. and 3000 c.p.s. respectively. Another formant filter 221 is likewise connected to the output terminals of the compressor 107b and has a passing range at least embracing the range of the four previously mentioned formant filters 220 i.e., has a passing range, for example, between 800 c.p.s. and 4000 c.p.s. Connected to each of the formant filters 220 and to the formant filter 221 is a rectifier 222 which is connected to a low-pass filter 223. The output terminals of each of the low-pass filters 223 are connected to a sub-formant unit 224 of the type shown in FIG. 13. The signals appearing at the output terminals of the sub-formant units 224 allow for determining the presence of one of the explosive sounds "p," "k," "t," and further to distinguish between these sounds.

It already has been mentioned that the position of the quasi-fix formants in the frequency band is to a certain extent a function of the fundamental frequency. A corresponding correction of the signals formed in the formant units as a function of the fundamental frequency may take place in the logic unit 127. Besides this, it is also possible to modify the passing ranges of the formant filters 121, 122 in dependency of the fundamental frequency. A signal which is a function of this fundamental frequency may be supplied from the logic system 127 to the formant filters as schematically shown by means of the dotted line 225 (FIG. 10).

Further, it is possible to tap-off a portion of the output signal of at least some of the sub-formant low-pass filters of the sub-formant units 130, 184 and 224, via suitable resistors (not shown) connected to the conduit 226. The signal appearing in this conduit 226 contains information concerning the rhythm of the spoken language. This signal, therefore, may be used to control a timer 227 which upon completion of the analysis of one phonetic sound allows the corresponding key of the typewriter to be actuated. A portion of the signals appearing in the auxiliary channels of the second compressors 105b, 106b and 107b of each compressor arrangement 105, 106, 107 may be tapped-off for example by means of resistors or diodes (not shown) connected to a conduit 229. The signal appearing in this conduit 229 is a function of the volume of the sounds transmitted to the microphone 101.

The information supplied by the logic system 127 may first of all be used to actuate the typed keys of a printer such as a typewriter, as schematically indicated by the block 230. Further, the signals may be used to control a typewriter for musical notes, as depicted at 231. Finally, the rhythm and the volume of the sound can be typed with the symbols, as schematically shown at 232 and 233.

Figure 18:
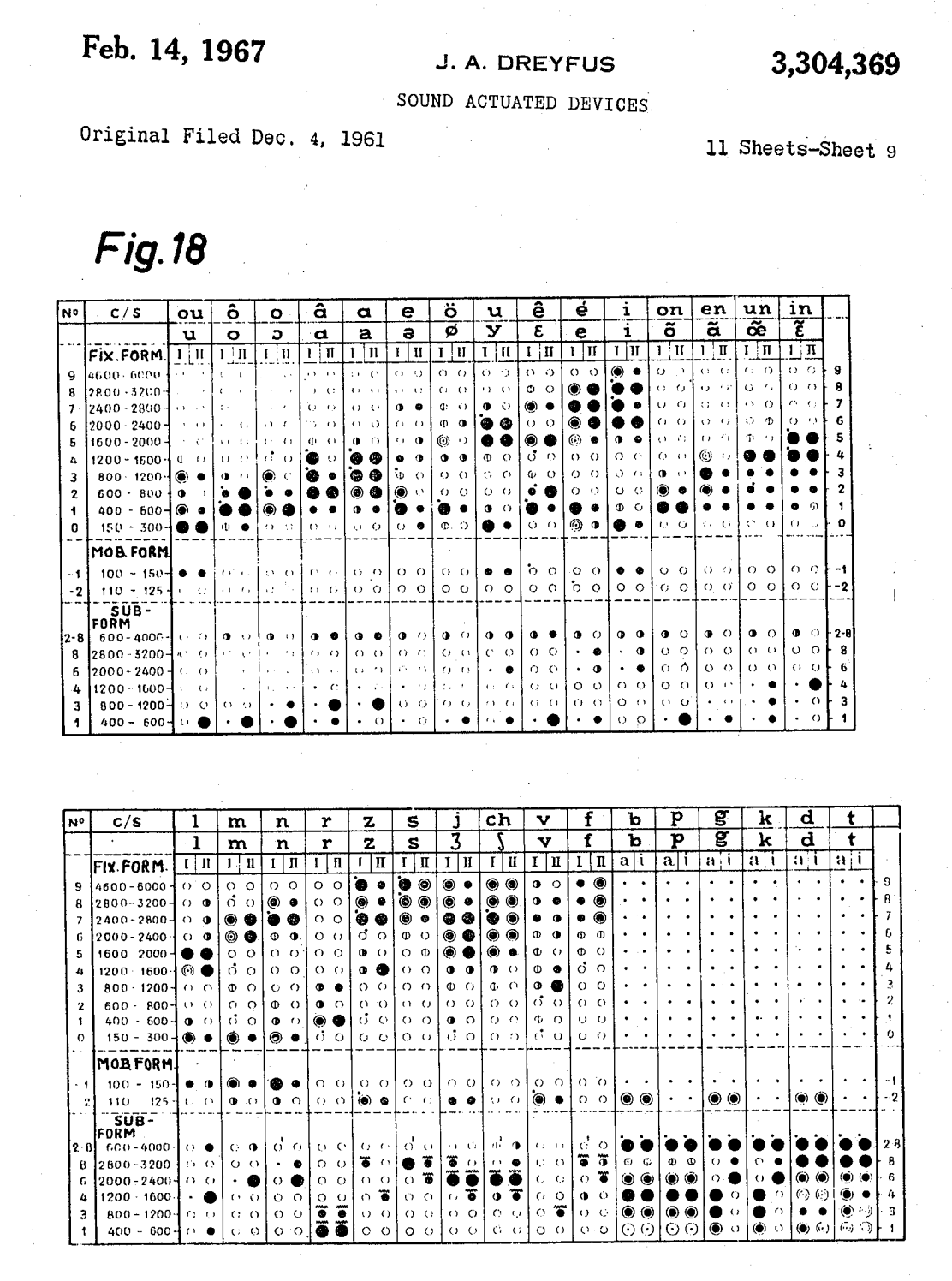

In FIG. 18 there is schematically shown the spectrums of the most important phonetic sounds of the French language. The values given in the chart of FIG. 18 were derived from an experimental device having the following features:

(1) Only one compressor was provided having a band-pass filter with a passing range between 80 c.p.s. and 6000 c.p.s. in the main channel and a high-pass filter with a passing range above 380 c.p.s., in the auxiliary channel.

(2) The speaker spoke monotonously at a fundamental frequency of about 150 c.p.s.

(3) The speaker spoke slowly i.e. with approximately 4.5 sounds per second.

The column I for each vowel or vowel-like sound contains the spectrum of the sound appearing during the course of speaking. The column II contains the spectrum of the corresponding sounds if singularly spoken and if held for about one second. In the right-hand portion of the lowermost chart of FIG. 18 there appear six vertical columns for the sounds "b," "p," "g," "k," "d," "t." Each column is further sub-divided into two vertical columns labeled with *a* and *i*. The left-hand sub-division of each column indicates the spectrum for a respective sound when combined with the sound "a" and the right-hand sub-division when combined with the sound "i." Thus for example the first column shows the spectrum for the sounds "ba" and "bi." The different levels are designated by the following key: a white circle designates the level range "0"; a small black circle corresponds to the level range "1"; a large black circle to the level range "2"; a black dot appearing alone designates an uncertain signal; a black dot on the side or adjacent a respective circle designates a 10% uncertainty of the information; a black full circle within a white circle designates an uncertain information i.e., a signal lying between the levels "1" and "2"; a wave line above a circle designates a fluctuation or modulation of the sub-formant. The two horizontal dotted lines extending laterally across the chart divide the chart into three groups. The uppermost group depicts in ten horizontal rows information concerning the quasi-fix formants (FIX FORM), with each row corresponding to the numerically indicated frequency range. The intermediate group designates in two frequency ranges the mobile formants and the follower formants, the latter after having undergone an additional amplification, while the lowermost group designates the sub-formants.

Figure 19:
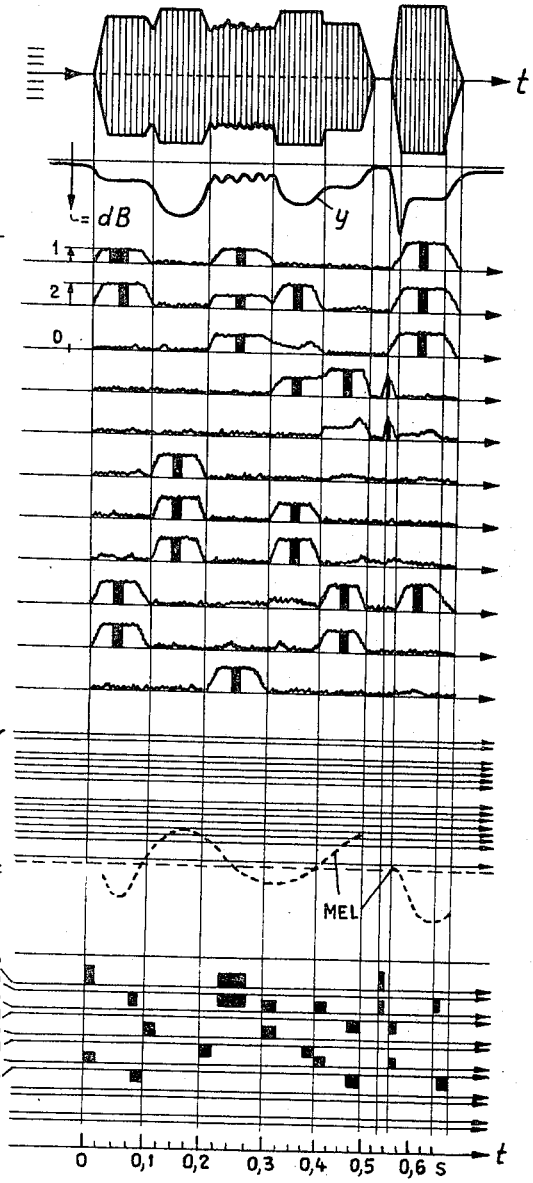
FIG. 19 is a chart illustrating the derived information from a spoken word during processing with a sound actuated device of the type shown in FIG. 10.

FIGURE 19 illustrates the spectrums of the formants and the sub-formants as a function of time when the word "NOVELTI" is spoken. It is to be considered that an oscillograph is connected to the input and output sides of the different analog-digital converters. The oscillograph, therefore, has to contain about 43 different channels.

The wave shape shown in FIGURE 19 illustrates the overall amplitude after the original signal has undergone a compression according to the teachings of the invention. The curve labeled Y shows the change of the controlling signal in the auxiliary channel of the compressor. The curves appearing to the right of the sub-division labeled "FIX FORM" illustrate the amplitude at the output terminals of nine formant filters which cover the frequency range between 150 c.p.s. and 3200 c.p.s. The solid black rectangles denote the digital signal derived from the amplitude values according to two positive standardized level ranges or classifications. The uppermost curves appearing to the right of the sub-division labeled "MOB FORM" correspond to the amplitude appearing below the fundamental frequency of 150 c.p.s. These curves, therefore, are an indication for the presence of follower formants. With this same sub-division, there appears a further curve for the frequency range of 150 c.p.s. to 384 c.p.s. The dotted curves labeled "MEL" illustrate the variation of the fundamental frequency. In the frequency range between 84 c.p.s. and 150 c.p.s. there does not appear any signal if the additional necessary amplification for the detection of follower formants is not provided. The black rectangles shown in the graphs to the right of the sub-division labeled "SUB-FORM" and depicting the frequency range from 150 c.p.s. to 3200 c.p.s. show the duration and the level of the sub-formant impulses whereby signals in the channels designated with reference letter P indicate a positive change of the amplitude and the signals in the channels designated with reference letter N a negative change of amplitude.

FIGURE 20 illustrates a flow diagram of the various stations of a sound actuated device. It is to be seen from FIG. 20 that the incoming signal is compressed in a compressor 301 and then processed by a plurality of different filters 302. The signals leaving these filters are converted into digital information by the converter 303. The resulting digital information is corrected in a normalizing or correcting unit 304, as will more fully be described hereinafter. The received information is used to derive timing pulses as indicated by the timer 305. Further, the digital information may be sampled by a sampling device 306. Finally, the digital information is fed to a matrix 307 which consists of, for example, groups of diodes or resistors. The matrix 307 derives information concerning the letters to be printed by the printer 309.

The function of these various stations will be described in connection with FIG. 21. In FIG. 21, three compressors 301a, 301b, 301c are provided in accordance with the invention and possess different time constants. Additionally, there are provided the filters 311, 312, 313 with different passing ranges in the respective auxiliary channels, as already described herein. The incoming signals e.g. from a microphone 300 are transmitted to a conventional compressor 301d which does not include a special filter in its auxiliary channel. The signals appearing at the auxiliary channels of the three first mentioned compressors are supplied to a unit 302a in which these signals are compared with the signals delivered by a conduit 314 connected to the auxiliary channel of the compressor 301d. The information delivered by the unit 302a permits detecting the dynamic components of the speech which are a function of the phonetics, the accentuation, and variations of the accentuation. These dynamic components further may be registered as a function of time by three channels 315 of a multi-channel oscillograph 316.

The analog information delivered by the three filter groups 302b, 302c and 302d permits distinguishing the mobile formants, the follower formants, the quasi-fix formants and the sub-formants. The signals fed to the filter arrangements 302c, 302d which select the quasi-fix formants and the sub-formants, are preferably derived from the two compressors 301a, 301b and 301b, 301c respectively. These compressors have different time constants.

The analog signals may be fed to the different channels of the oscillograph 316. For example, the oscillograph 316 may be supplied with three analog signals from the unit 302a, twenty analog signals from the unit 302b and twenty-four analog signals from each of the units 302c and 302b, as indicated by the reference numerals 315, 317, 318 and 319, respectively. Such a multi-channel oscillograph 316 allows for a detailed analysis of the sound, and further to derive information concerning phonetics, dynamics, harmony, melody, rhythm and particularities of the character of the speaker.

The analog information fed to the multi-channel oscillograph 316 is converted into digital information as depicted by the blocks 303a, 303b, 303c, 303e. Again, the analog signals are classified according to preferably 2 or 3 different level ranges. The digital information appearing at the output sides of the converters is fed to memories 304a, 304b, 304c, 304d and 304e in which the different signals are compared with one another. This comparison allows for correction of the given information. More in detail, the quasi-fix formants of the memory 304d are corrected first by the memory element 304c containing the fundamental frequency, and secondly by individual groups 322 adapted for different kinds of pronunciation, and thirdly by a member 304f which is adapted to different languages or dialects. The setting of the units 322 and 304f may be performed automatically or by hand.

The sub-formants in the memory 304e are also corrected for different languages, dialects etc. as indicated by line 323. It should be mentioned, however, that the corrections could also be effected in the analog part of the arrangement shown, as indicated by conduits 322a and 323a. The corrected information is stored in memories 305a, 305b, 305c, 305d and 305e and may be read out at any time. The information is supplied to a matrix 307a via an intermediate memory 307c. The matrix preferably is constructed of diodes but can also consist of resistors. The information of the matrix is supplied by means of a second intermediate memory 307d to actuate a typewriter 307b, for example.

For timing the different steps, a timer 305f is provided which produces timing signals controlled by the sub-formants. It, therefore, is possible to ensure that the keys of the typewriter are actuated at the proper time. It is advantageous to provide a set of switches 307e to which it is possible to set the repetition of the different keys in a given time range. It should be possible, for example, to indicate by setting one of the switches 307e whether a key of a typewriter is to be actuated once, twice etc. It should be here mentioned that a correction for language, dialect etc. may also be performed by the matrix 307a, as indicated at 307f, 307g and 307h.

Preferably five groups of information are delivered to the printer 307b, i.e. information concerning the type key to be actuated, the spacing between the letters, spacing to a new line, relative position between paper and printing type, and setting of punctuation, as generally indicated by lines 307e, 307k, 307l and 307m, respectively. Other information, for example, concerning the dynamics, melody, harmony, transients, noise and rhythm, may be fed to other printers or typewriters 307p which print the respective information.

Further, it should be noted that a typewriter may be provided which prints words instead of letters. It is also to be mentioned that it is possible to convert the information of the phonetic language into the normal written language. To effect this, there may be provided a translating machine 307g which is supplied with the information stored in the memory 307d. This translating machine 307g may include an element 307r in order to achieve correct orthography. It is to be mentioned, however, that the translating computer and the orthographic printer are elements, the costs of which are considerably higher than the costs of the remaining part of the described apparatus.

What I claim is:

1. A circuit for compressing the amplitude of an electrical signal representative of sounds and thereby improve sound recognition in speech analysis, especially of human speech, said circuit comprising:
    a main channel responsive to said electrical signal;
    and an auxiliary channel including means for regulating the degree of gain of said main channel and means for passing only the frequencies of the said sounds above the first formant of said sounds and below the second formant of said sounds thereby facilitating the recognition of said sounds by regulting the gain of said main channel by a signal including only said frequencies.

2. A circuit as in claim 1 where said main channel includes:
    a high pass filter responsive to said electrical signal, said auxiliary channel being responsive to the output from said high pass filter.

3. A circuit as in claim 2 where said main channel includes an amplifier regulated by said regulating means.

4. A circuit as in claim 3 where said frequency passing means is responsive to the output from said amplifier.

5. A circuit as in claim 3 where said main channel includes means for adjustably delaying the output from said high pass filter; said amplifier being responsive to the output from said delay means and where said frequency passing means in the auxiliary channel is responsive to the output from said high pass filter.

6. A circuit as in claim 2 where the lowest frequency passed by said frequency passing means in the auxiliary channel is higher than the lowest frequency passed by said high pass filter in the main channel.

7. A circuit as in claim 1 where said auxiliary channel regulating means includes a rectifier and a low-pass filter responsive to the output from said frequency passing means for providing said regulation.

8. A circuit as in claim 7 where the highest frequency passed by said low-pass filter is lower than the lowest frequency passed by said frequency passing means in the auxiliary channel and the lowest frequency passed by said high-pass filter in the main channel.

9. A circuit as in claim 1 where said frequency passing means in the auxiliary channel is a bandpass filter.

10. A circuit as in claim 1 where at least two high-pass filters are included in the auxiliary channels so that the resultant gradient is greater than 6 db per octave.

11. A circuit as in claim 1 where said frequency passing means in the auxiliary channel comprises a high-pass filter portion and a low-pass filter portion with mutually exclusive suppression bands.

12. A circuit as in claim 1 where at least two such amplitude compressors are in circuit connection.

13. A circuit as in claim 1 where said frequency passing means in the auxiliary channel includes only RC members.

14. A circuit as in claim 1 where the high pass part of said frequency passing means is located below 1000 cycles.

15. A circuit as in claim 14 where the low pass part of said frequency passing means is located below 6000 cycles.

16. A circuit as in claim 15 where said main channel includes a high pass filter responsive to said electrical signal, the limit of said high pass filter lying below 1000 cycles; and said auxiliary channel being responsive to the output from said high pass filter.

References Cited by the Examiner

UNITED STATES PATENTS

| | | | |
|---|---|---|---|
| 2,312,260 | 2/1943 | Miller | 179—1 |
| 2,358,045 | 9/1944 | Barney | 333—14 |
| 2,799,734 | 7/1957 | Camp | 179—1 |

KATHLEEN H. CLAFFY, *Primary Examiner.*

R. MURRAY, *Assistant Examiner.*